United States Patent
Kubo et al.

(10) Patent No.: US 10,662,257 B2
(45) Date of Patent: May 26, 2020

(54) CELLULOSE XANTHATE NANOFIBER

(71) Applicant: RENGO CO., LTD., Osaka (JP)

(72) Inventors: Junichi Kubo, Fukui (JP); Tomoyuki Nakatsubo, Fukui (JP); Kenichi Ito, Osaka (JP); Hirokuni Tajima, Osaka (JP)

(73) Assignee: RENGO CO., LTD., Osaka (JP)

( * ) Notice: Subject to any disclaimer, the term of this patent is extended or adjusted under 35 U.S.C. 154(b) by 0 days.

(21) Appl. No.: 15/781,515

(22) PCT Filed: Dec. 22, 2016

(86) PCT No.: PCT/JP2016/088522
§ 371 (c)(1),
(2) Date: Jun. 5, 2018

(87) PCT Pub. No.: WO2017/111103
PCT Pub. Date: Jun. 29, 2017

(65) Prior Publication Data
US 2018/0273644 A1    Sep. 27, 2018

(30) Foreign Application Priority Data

Dec. 25, 2015  (JP) ................................. 2015-253730

(51) Int. Cl.
| C08B 9/00 | (2006.01) |
| C08L 1/22 | (2006.01) |
| D01F 2/10 | (2006.01) |
| D01F 2/06 | (2006.01) |
| D01D 5/40 | (2006.01) |
| C08B 9/02 | (2006.01) |
| C08B 16/00 | (2006.01) |

(52) U.S. Cl.
CPC .................. *C08B 9/00* (2013.01); *C08B 9/02* (2013.01); *C08B 16/00* (2013.01); *C08L 1/22* (2013.01); *D01D 5/40* (2013.01); *D01F 2/06* (2013.01); *D01F 2/10* (2013.01); *C08L 2205/16* (2013.01)

(58) Field of Classification Search
CPC .......... C08B 9/00; C08L 2205/16; C08L 1/22; D01F 2/10
See application file for complete search history.

(56) References Cited

FOREIGN PATENT DOCUMENTS

| CA | 380004 | 3/1939 |
| CN | 101054735 | 10/2007 |
| CN | 102517669 | 6/2012 |
| EP | 1 882 760 | 1/2008 |
| GB | 493696 | 10/1938 |
| JP | 2011-185122 | 9/2013 |
| JP | 5500842 | 5/2014 |
| WO | 2013/191640 | 12/2013 |

OTHER PUBLICATIONS

Bischoff et al., Properties of NR Composites Containing Nonconventional Fillers, Tech. Meeting of the Rubber Division of the ACS, 2009, vol. 176th, vol. 3, pp. 1726-1747.*
International Preliminary Report on Patentability dated Jun. 26, 2018 in International (PCT) Application No. PCT/JP2016/088522.
International Search Report dated Mar. 21, 2017 in International (PCT) Application No. PCT/JP2016/088522.
Paako et al., "Enzymatic Hyrdrolysis Combined with Mechanical Shearing and High-Pressure Homogenization for Nanoscale Cellulose Fibrils and Strong Gels", Biomacromolecules, 8 (6):1934-1941 (2007).
Saito et al., "Preparations of Cellulose Singe Microfibrils from Native Celluloses by TEMPO-Mediated Oxidation", Cellulose Commun., 14 (2): 62-66 (2007), with English abstract.
Bischoff et al., "Properties of NR Composites Containg Nonconventional Fillers", Tech. Meet. Rubber Div. Am. Chem. Soc., vol. 3, p. 1726-1747 (2009).
Extended European Search Report dated Jan. 4, 2019 in corresponding European Patent Application No. 168789.9.

* cited by examiner

*Primary Examiner* — Robert D Harlan
(74) *Attorney, Agent, or Firm* — Wenderoth, Lind & Ponack, L.L.P.

(57) ABSTRACT

Nanofiber that keep crystallinity are obtained from a cellulose material under light load. The nanofiber are obtained by treating a material containing cellulose with 4% by mass or more and 9% by mass or less of an aqueous alkali metal hydroxide solution to produce alkali cellulose, reacting the alkali cellulose with carbon disulfide to give cellulose xanthate, and defibrating the cellulose xanthate. Then, the xanthate is treated with acid or heat to be regenerated into cellulose nanofiber.

10 Claims, 4 Drawing Sheets

CELLULOSE XANTHATE NANOFIBER

TECHNICAL FIELD

The present invention relates to nanofiber produced from a cellulose material and to a method for producing the nanofiber.

BACKGROUND ART

Attention is being drawn to nanocellulose, a new material that has a fiber diameter as small as less than 1 μm achieved by disintegrating a fiber constituting a plant-derived cellulose material. Among such materials as called nanocellulose, several materials in different sizes or aspect ratios have been proposed. In particular, the materials having a fiber diameter of about 4 to 100 nm and a length of 5 μm or more, often called cellulose nanofiber, cellulose nanofibrils, or fibrillated cellulose, have been the target of ongoing manufacture and research due to their excellent properties as reinforcing fibers. While various names are proposed for such materials, they are called cellulose nanofiber herein. In addition, materials belonging to modified cellulose and having a size and aspect ratio similar to those of cellulose nanofiber are collectively called nanofibers herein.

To produce cellulose nanofiber, cellulose has to be finely defibrated. Not only because cellulose itself is a strong material but also because wood-derived cellulose contains lignin and other strong substances, it is difficult to defibrate cellulose into cellulose nanofiber of an appropriate size. To overcome this problem, various methods have been proposed.

For example, Non-Patent Document 1 listed below reports a defibrating method with a high-pressure homogenizer or the like, the method including pressing a pulp slurry into a small void space and releasing pressure to allow the defibration to occur. However, such mechanical method is problematic in that defibration requires a great deal of energy because treatment has to be repeated many times to cause the defibration to proceed. Such method is also problematic in that capable machines are limited and the obtained cellulose nanofiber is susceptible to damage because it is difficult to obtain fibers having a diameter of the order of several nanometer and treatment with a high pressure of 200 MPa or higher is repeated.

Patent Document 1 listed below proposes a defibrating method that includes pretreatment of raw materials with acid to remove lignin so that the subsequent defibration is facilitated. This method can reduce an applied external force and thus less damaged cellulose nanofiber is obtained, compared with a simple mechanical method that includes applying high pressure.

Non-Patent Document 2 and Patent Document 2 listed below each report a technique for facilitating defibration by introducing a carboxyl or carboxymethyl group into cellulose. When pulp is treated in the presence of a catalytic amount of 2,2,6,6-tetramethylpiperidine-1-oxyl radical (TEMPO) and sodium hypochlorite as an oxidant, a carboxyl group can be efficiently introduced to C-6 position of the cellulose constituting fibers on the surface of cellulose microfibrils (Non-Patent Document 2). A carboxymethyl group can also be introduced by reacting pulp with chloroacetic acid sodium salt in the presence of alkali (Patent Document 2). Both TEMPO-oxidized cellulose containing an introduced carboxyl group and carboxymethyl cellulose containing an introduced carboxymethyl group can be defibrated more easily than unmodified cellulose. Consequently, a product equivalent to a nanofiber in size can be obtained with fewer treatments at lower pressure than a simple mechanical method involving high-pressure treatment.

PRIOR ART REFERENCES

Patent Documents

Patent Document 1: Japanese Patent No. 5500842
Patent Document 2: Japanese Unexamined Patent Application Publication No. 2013-185122

Non-Patent Document

Non-Patent Document 1: Enzymatic Hydrolysis Combined with Mechanical Shearing and High-Pressure Homogenization for Nanoscale Cellulose Fibrils and Strong Gels: Biomacromolecules, 2007, 8 (6), 1934-1941
Non-Patent Document 2: Preparation of cellulose single microfibrils from native cellulose by Tempo-mediated oxidation: Cellulose Commun., 2007, 14 (2), 62-66

SUMMARY OF THE INVENTION

Technical Problem

However, the method described in Patent Document 1 imposes a great burden on pretreatment because delignification requires a long-time treatment with, for example, an acid.

Methods described in Patent Document 2 and Non-Patent Document 2 merely provide TEMPO-oxidized cellulose or carboxymethyl cellulose, but not provide cellulose nanofiber themselves. They are modified cellulose nanofibers. In addition, both TEMPO-oxidized cellulose and carboxymethyl cellulose are difficult to be turned back into cellulose, and thus these modified cellulose nanofibers cannot give unmodified cellulose nanofibers. Furthermore, bonds in cellulose are broken during modification by introducing a carboxyl group, with the result that the degree of polymerization of an obtained equivalent of a nanofiber is reduced to about a quarter of the original degree. Thus, it is difficult to keep the strength required for the obtained equivalent of a nanofiber. Furthermore, because the TEMPO employed in the method is expensive, it is difficult to reduce the cost of producing the resulting nanofiber.

Accordingly, an objective of the present invention is to obtain nanofiber that have a high aspect ratio by preventing the fibers from shortening while reducing energy consumption during production, in an effort to obtain a defibrated material equivalent to nanofiber from a cellulose material. Another objective of the present invention is to turn the nanofiber back into cellulose with ease and high yields so as to obtain cellulose nanofiber with high efficiency.

Solution to Problem

The present invention solves the above-described problems by treating a material containing cellulose with 4% by mass or more and 9% by mass or less of an aqueous alkali metal hydroxide solution to produce alkali cellulose, reacting the alkali cellulose with carbon disulfide to give cellulose xanthate, and defibrating the cellulose xanthate. The cellulose xanthate is considered to be more easily defibrated than simple cellulose, owing to the presence of a xanthate group (—OCSS—) introduced to any of the hydroxyl groups at C-2, C-3 positions and C-6 of cellulose. Hence, nanofiber can be easily produced under relatively light load compared with conventional techniques that involve repeated defibrations under heavy load such as high pressure or high temperature. Because defibration is carried out under light load and cellulose fibers are not cut when xanthate groups are introduced, cellulose fibers are less likely to be shortened throughout the processes, and thus long nanofiber with a high aspect ratio is more likely to be obtained. Through acid treatment or heat treatment, the xanthate group can be turned back into a hydroxyl group quickly and extremely efficiently. With the xanthate group turned back into a hydroxyl group, the cellulose xanthate nanofiber is turned into a cellulose nanofiber.

Although this production method is similar to a method for producing cellophane from pulp through viscose as an intermediate, the production method has a quite distinct feature. In the case of producing viscose, the pulp (a material containing cellulose) is first subjected to alkali treatment with an aqueous alkali metal hydroxide solution having a concentration as high as about 10 to 30 mass %, so that the aqueous alkali metal hydroxide solution permeates into a crystalline region of cellulose contained the pulp, resulting in alkali cellulose that has a crystalline structure of cellulose II ($[C_6H_7O_2(OH)_2(ONa)]_n$). At this point of time, the fiber length is kept while the average degree of polymerization is halved from about 800 to about 400. The alkali cellulose having lost the original crystallinity is reacted with carbon disulfide ($CS_2$) to give cellulose xanthate ($[C_6H_7O_2(OH)_2(OCSSNa)]_n$). The obtained cellulose xanthate is dissolved in an aqueous alkali metal hydroxide solution to give colloidal viscose. The viscose is treated with a dilute sulfuric acid or the like to be turned back into cellulose in the form of a film, thereby producing cellophane.

One of the greatest differences between a method according to the present invention and a conventional technique for producing cellophane by using viscose is the concentration of an aqueous alkali metal hydroxide solution used for alkali treatment. When treated with an aqueous alkali metal hydroxide solution at a high concentration, the cellulose-containing material can no longer keep the crystallinity because the aqueous alkali metal hydroxide solution permeates to a crystalline region of the cellulose. Thus, nanofiber with the original crystallinity cannot be obtained. As in the present invention, upon alkali treatment with an aqueous alkali metal hydroxide solution at a concentration of 4 to 9 mass %, the cellulose-containing material is pretreated for a xanthogenation intended for easier defibration, while keeping the crystallinity to the extent that physical properties of a nanofiber can be maintained.

Effects of the Invention

The present invention makes it possible to obtain cellulose xanthate nanofiber through simple defibration. If necessary, the cellulose xanthate can be turned back into unmodified cellulose, and cellulose nanofiber can be easily obtained from the cellulose xanthate nanofiber.

DESCRIPTION OF EMBODIMENTS

Figure 1:
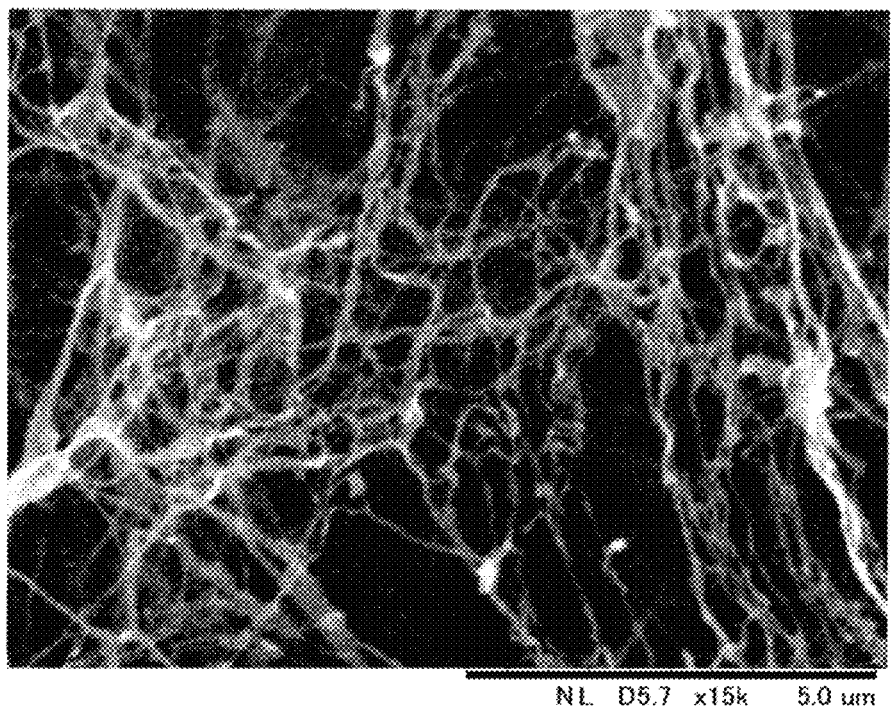
FIG. 1 is an SEM photograph of defibrated xanthate nanofiber taken at 15,000× magnification according to an example.

The present invention will now be described in detail. The present invention relates to a production method for obtaining nanofiber from a cellulose material and to the obtained nanofiber.

In the present invention, the cellulose material used as a material refers to a material containing α-cellulose having the crystalline structure of cellulose I. In contrast, materials containing α-cellulose having the crystalline structure of cellulose II cannot be suitably used. Examples of suitable materials include, without limitation, kraft pulp or sulfite pulp made by processing wood, biomass-derived materials such as wood flour or rice straw, paper-derived materials such as recycled paper, filter paper, or paper dust, and processed cellulose products retaining the crystallinity such as powdered cellulose or microcrystalline cellulose. These cellulose materials may not necessarily be pure α-cellulose but may contain other organic or inorganic materials such as β-cellulose, hemicellulose, or lignin to the extent that they can be removed. The tam "cellulose" appearing in the descriptions below refers to "α-cellulose". Wood pulp, among other cellulose materials, is desirably used because the length of original cellulose fiber tends to affect to the shape of derived nanofiber.

A production method according to the present invention includes alkali treatment in which the aforementioned cellulose material is treated with an aqueous alkali metal hydroxide solution, such as sodium hydroxide or potassium hydroxide, so that alkali cellulose can be obtained. Among others, sodium hydroxide is suitably used. The concentration of the aqueous alkali metal hydroxide solution is to be at least 4 mass %, and is preferably at least 5 mass %. When the concentration is less than 4 mass %, cellulose is not mercerized to a satisfactory extent and the subsequent xanthogenation produces a non-negligible amount of byproduct, resulting in a lower yield. In addition, the effect of facilitating defibration, which is described later, will be insufficient. The concentration of the aqueous alkali metal hydroxide solution is preferably not more than 9 mass %. When the concentration exceeds 9 mass %, the alkali metal hydroxide solution not only causes the cellulose to be mercerized but also permeates into a cellulose crystalline region. Then, the crystalline region can no longer keep crystalline structure of cellulose I, eventually creating difficulty in providing nanofiber.

The time of the aforementioned alkali treatment is preferably at least 30 minutes, and is more preferably at least one hour. If the time is less than 30 minutes, the mercerization does not proceed satisfactorily, which may cause a final yield to be excessively low. The time of the alkali treatment is preferably not more than six hours, and is more preferably no more than five hours. Mercerization for more than six hours does not increase the amount of produced alkali cellulose in spite of the extra time, resulting in lower productivity.

The temperature for the alkali treatment may be around ambient temperature or around a temperature to which ambient temperature is raised by generated heat. However, when the treatment temperature is extremely low, such as under refrigeration conditions, the alkali solution tends to permeate into cellulose, which means the alkali metal hydroxide solution may possibly permeate into a cellulose crystalline region even if the alkali concentration falls within the above-described range, making it difficult to keep the crystalline structure of cellulose I. Thus, when the temperature for the alkali treatment is in a range from freezing temperature to lower than 10° C., it is particularly preferable that the concentration of an alkali metal hydroxide solution is within a range of 4% by mass or more and 7% by mass or less. Such tendency is not seen at 10° C. or higher, and thus the concentration of an aqueous alkali metal hydroxide solution is preferably 4% by mass or more and 9% by mass or less as described above. On the other hand, overheating may cause depolymerization of cellulose.

The alkali cellulose obtained through the alkali treatment is then preferably subjected to solid-liquid separation to remove the aqueous component as much as possible. This is because the subsequent xanthogenation can proceed more easily on the alkali cellulose containing less moisture. As a solid-liquid separation method, a generally used dehydrating technique, such as centrifugal separation or filtering, may be used. After the solid-liquid separation, the alkali cellulose preferably contains alkali metal hydroxide at a concentration of about 3% by mass or more and 8% by mass or less. Too thick or too thin alkali cellulose decreases operation efficiency.

The alkali treatment is followed by a xanthogenation in which the above-described alkali cellulose is reacted with carbon disulfide ($CS_2$) to substitute a ($-O^-Na^+$) group with a ($-OCSS^-Na^+$) group so as to give cellulose xanthate. Note that Na as appearing herein represents alkali metals and that any alkali metal other than Na is subjected to the same treatment.

The average substitution degree of the xanthate group per glucose unit during the xanthogenation is preferably at least 0.33. In other words, it is preferable that at least one third of all the glucose units in average have a ($-OCSS^-Na^+$) group through substitution. This is because, when a xanthogenation is inadequately caused to contain too few ($-OCSS^-Na^+$) groups, the effect of facilitating the subsequent defibration will not be satisfactorily exerted. From the viewpoint of yield and efficiency, the average substitution degree of the xanthate group is preferably 1. In other words, it is preferable that at least one of the three ($-OH$) groups per original glucose unit is substituted with a ($-OCSS^-Na^+$) group. When the substitution degree of the xanthate group exceeds 1.2, the xanthate groups will make individual cellulose xanthate polymers too hydrophilic, and the cellulose xanthate polymers would tend to dissolve during defibration. Thus, the substitution degree of the xanthate group is preferably not more than 1.2. The substitution degree of the xanthate group can be expressed in a degree of xanthation relative to all the ($-OH$) groups contained in original cellulose as follows. The degree of xanthation is preferably at least 10 mol % (equivalent to the average substitution degree 0.33), preferably not more than 40 mol % (equivalent to the average substitution degree 1.2), and more preferably not more than 33.3 mol % (equivalent to the average substitution degree 1.0).

To raise the average substitution degree of the xanthate group, it is desirable to supply a sufficient amount of carbon disulfide. Specifically, it is desirable that carbon disulfide is supplied in an amount equivalent to at least 10 mass % relative to the mass of the cellulose contained in alkali cellulose. When too little carbon disulfide is supplied, the substitution degree of the xanthate group is excessively low. Consequently, the effect of facilitating defibration with less energy according to the present invention cannot be fully exerted. While it is preferable to add carbon disulfide in an amount allowing the average substitution degree of the xanthate group to be 1.2 or less, carbon disulfide supplied in an excessive amount will be wasted without reacting with alkali cellulose, causing an extra high cost of supplying carbon disulfide. Assuming that carbon disulfide is completely reacted for substitution, about 24 mass % carbon disulfide would correspond to the degree of xanthation of about 33 mol % (equivalent to the average substitution degree of the xanthate group of 1). In reality, such complete substitution would not occur and some unreacted carbon disulfide would be left.

To raise the above-described average substitution degree of the xanthate group, carbon disulfide is preferably in contact with alkali cellulose for at least 30 minutes, and more preferably for at least one hour. This is because it takes much time for carbon disulfide to permeate into alkali cellulose, although a xanthogenation quickly develops upon contact with carbon disulfide. On the other hand, the maximum contact time may be six hours or less because carbon disulfide can fully permeate into a lump of dehydrated alkali cellulose in six hours and a xanthogenation occurs to the fullest extent.

For the purpose of xanthogenation, it is preferable that carbon disulfide is supplied to dehydrated alkali cellulose and the gaseous carbon disulfide is reacted with the alkali cellulose at a temperature not higher than 46° C. A temperature higher than 46° C. may cause depolymerization due to the decomposition of an alkali cellulose, while creating other problems such as a larger amount of byproduct or detachment of generated xanthate groups because of the difficulty in causing uniform reactions.

It is considered that the xanthogenation allows cellulose fibers (cellulose xanthate molecules) retaining the crystallinity to have higher polarity to increase hydrophilicity, as well as to improve dispersibility due to electrostatic repulsion of xanthate groups. Hence, cellulose xanthate obtained by the aforementioned xanthogenation can provide cellulose xanthate nanofiber, which have a size and aspect ratio equivalent to those of the above-described nanofiber, through mechanical defibration under lighter load than conventional methods, while keeping the crystalline structure of cellulose I included in the original cellulose material.

The cellulose xanthate that has undergone the xanthogenation already has the ability to facilitate defibration owing to the electrostatic repulsion of xanthate groups. The required load and the number of defibrations can further be decreased by washing the cellulose xanthate to remove impurities, alkali, and carbon disulfide after the xanthogenation. As a liquid used for the washing, water is preferably used because water decreases an alkaline pH and is unlikely to damage cellulose xanthate fibers themselves. The washing may be done with running water or by alternating adding water and dewatering, as long as the fiber length is little affected. In the case where sodium hydroxide, potassium hydroxide, or a similar substance is used as alkali metal hydroxide, the washing is done to the extent that the slurry resulting from the washing to be used for defibration has a pH preferably not higher than 10.5, and more preferably not higher than 9.5. In the case where sodium hydroxide is used, the concentration of NaOH in the slurry is preferably not higher than 40 ppm, and more preferably not higher than 8 ppm.

However, as described later, in the case where ammonia water or an aqueous aliphatic or aromatic amine solution is used for washing and solution replacement, a slurry having a pH as high as greater than 10.5 may be used for defibration. Washing with ammonia or amines allows alkali metal ions such as $Na^+$ and $K^+$, which are cations in the xanthate group, to be substituted with ammonium ions. With alkali metal ions fully removed, defibration can be facilitated in spite of a relatively high pH.

For defibrating the cellulose xanthate that has undergone the xanthogenation, the cellulose xanthate is preferably dispersed in water. In the water, other components may coexist including inorganic materials, surfactants, water-soluble polymers, polymer latex, and resin monomers. As a defibration technique, any of generally used methods may be used as long as the fiber length is not significantly reduced. Example defibration methods include defibrating the cellulose xanthate dispersed in water using a high-speed rotary homogenizer, a bead mill, an ultrasonic wave disperser, a high-pressure homogenizer, a disk refiner, or the like. Note that any method needs much less energy than that required by conventional techniques such as the one described in Patent Document 1. Accordingly, the imposed load, such as pressure and rotational frequency, can be reduced and the treatment time can be shortened, as compared with conventional techniques. Defibration under low load is also preferable from the viewpoint of keeping the fiber length to the fullest extent.

Before defibration, some or all of alkali metal ions, such as Na+, as included in xanthate groups in cellulose xanthate may be exchanged for other cations. Examples of the cations include hydrogen ions, potassium, lithium, and other alkali metal ions, silver and other monovalent metal ions, ammonium ions, aliphatic or aromatic ammonium, and any combination thereof. For example, the cellulose xanthate may be hydrophobized by carrying out the salt exchange by which alkali metal ions are substituted with quaternary ammonium cations, which are cationic substitution substances, and then the defibration may be performed in an organic solvent such as ethanol, dimethylformamide, or dimethylacetamide. Alkali metal ions being present during defibration tend to cause coagulation in the organic solvent. However, carrying out the salt exchange to exchange the alkali metal ions for quaternary ammonium cations can increase hydrophobicity to prevent the coagulation in the organic solvent, thereby facilitating the defibration. In addition, if it is desirable to treat the obtained nanofiber in an organic solvent before that is utilized, dehydrating may be omitted after the defibration in an organic solvent.

Examples of the aforementioned quaternary ammonium cations include tetrabutylammonium cations, tetrapropylammonium cations, tetraethylammonium cations, decyltrimethylammonium cations, dodecyltrimethylammonium cations, hexyldimethyloctylammonium cations, benzyltriethylammonium cations, and triethylphenylammonium cations.

Another defibration technique may be carrying out the salt exchange to substitute alkali metal ions included in xanthate groups in the cellulose xanthate with quaternary ammonium cations so as to obtain an ammonium salt, and then performing the defibration in water. Because the quaternary ammonium cations help ion dissociation, this technique exerts the effect of facilitating defibration, and is particularly useful when water-based treatment is desired after the defibration.

Still another defibration technique may be defibrating the cellulose xanthate in a water-based or organic solvent, and then carrying out the salt exchange to substitute alkali metal ions in the cellulose xanthate with quaternary ammonium cations, and then transferring the cellulose xanthate into an organic solvent.

Note that ion exchange may be performed on alkali metal ions or cations substituting the alkali metal ions, which are included in the defibrated cellulose xanthate, after the defibration but prior to the regeneration, and then the xanthate nanofiber that have undergone the ion exchange may be subjected to regeneration, which is described later. Examples of cations $M^{n+}$ for the ion exchange include hydrogen ions, $Li^+$, $Na^+$, $K^+$, and other alkali metal ions except the original alkali metal ions, $Ag^+$ and other monovalent metal ions, ammonium ions, and aliphatic or aromatic ammonium ions. Original cations may be substituted with not only monovalent ions (n=1) but also divalent (n=2) ions such as $Ca^{2+}$ and $Mg^{2+}$ or trivalent (n=3) metal ions. In addition, the cellulose having undergone the xanthogenation may include other functional groups than hydroxyl groups.

Cellulose nanofiber can be obtained by regenerating the cellulose xanthate nanofiber (including cationic substitution substances created by substituting alkali metal ions with other cations) that are obtained through defibration of the above-described cellulose xanthate. The regeneration involves turning a xanthate ($-OCSS^-M^{n-1}$) group into a ($-OH$) group to regenerate the cellulose xanthate into cellulose, where n is an integer of 1 to 3. A specific method for the regeneration may be treating with an acid. An acid can be used to develop a reaction in which a xanthate group or its cation-substituted group is turned into a hydroxyl group without significantly reducing the fiber length. Examples of the acid used for this purpose include mineral or organic acids. A mineral acid, such as hydrochloric acid, sulfuric acid, or nitric acid, is preferable. The pH of an acid used for the treatment is preferably not higher than 3.

As another regeneration method, cellulose nanofiber can also be obtained by heating the above-described cellulose xanthate nanofiber to dissociate carbon disulfide from cellulose xanthate nanofiber molecules (including cationic substitution substances created by substituting alkali metal ions with other cations $M^{n+}$), thereby regenerating the cellulose xanthate into cellulose. Although the extent of regeneration can be controlled by adjusting the heating time and temperature, the heating temperature is preferably 40° C. or higher. The regeneration time can be shortened by using a higher temperature or a longer heating time; however, appropriate conditions should be act so as not to cause overheating, thus preventing cutting of a cellulose fiber and depolymerization. The cellulose xanthate nanofiber in the form of a dry matter or slurry may be heated.

Although the foregoing regeneration can achieve the lower detection limit of an average degree of xanthation of 0.1 mol % or less, desulfurization may further be carried out after the regeneration depending on the intended use. The desulfurization may be carried out in conjunction with bleaching.

The desulfurization is not limited to any specific method, and thus desulfurization methods generally used in other fields may be used, provided that the fiber length of a cellulose nanofiber is not excessively shortened. Examples of the method may include using an aqueous sodium sulfide solution to carry out the desulfurization.

The bleaching is not limited to any specific method, and thus bleaching methods generally used in other fields may be used, provided that the fiber length of a cellulose nanofiber is not excessively shortened. Examples of the method may include using sodium hypochlorite or a hydrogen peroxide solution to carry out the bleaching.

According to the present invention, the cellulose nanofiber obtained by regenerating cellulose xanthate nanofiber can be suitably used as reinforcing fibers, with a small average fiber diameter, a large fiber surface area, a sufficient fiber length, and reduced depolymerization of cellulose contained in the original cellulose material. This is achieved because depolymerization only occurs during the alkali treatment, which is one of the above-described processes, while almost no depolymerization occurs in any of the xanthogenation, the defibration, and the regeneration. The achievement is also attributed to reduced depolymerization during the alkali treatment in which the concentration of an aqueous alkali metal hydroxide solution is kept lower.

Cellulose xanthate nanofiber and cellulose nanofiber obtained according to the present invention have an average fiber length of 2 μm or more and 20 μm or less. This is because depolymerization hardly occurs in the processes except mercerization; the average degree of polymerization is likely to be about 300 or more and 800 or less. The average degree of polymerization may be 300 or less by, for example, prolonging the mercerization, which will produce other effects such as yield loss or a decrease in aspect ratio. The individual nanofiber have an average fiber diameter of 4 nm or more and 100 nm or less presenting a very high aspect ratio, and can be suitably used as reinforcing fibers. The average degree of xanthation of obtained cellulose xanthate nanofiber can be adjusted within a range of 0.1 mol % or more and 33.3 mol % or less according to the intended use. This range of values is equivalent to 0.003 or more and 1 or less in terms of average substitution degree of the xanthate group. By controlling the extent of defibration, the main component of the xanthate nanofiber can have an average fiber length of 2 μm or more and 100 μm or less and an average fiber diameter of 3 nm or more and 250 nm or less. Although a smaller average fiber diameter is preferable for a greater reinforcing effect with a larger fiber surface area, keeping the cellulose crystallinity is important for a low linear expansion coefficient and high elastic modulus, and thus the average fiber diameter is preferably at least 2 nm, which is the fiber diameter of a cellulose crystalline unit. In addition, from the viewpoint of rejecting an incompletely defibrated fiber, the average fiber diameter is preferably not larger than 250 nm.

For producing these cellulose xanthate nanofiber and cellulose nanofiber, whether each product has properties of nanofiber can be determined by checking if the obtained product exhibits the features specific to nanofiber. A first feature of nanofiber may be the viscosity of slurry almost unaffected by temperature changes. This feature arises from the nanofiber not dissolved but merely dispersed in the slurry. A second feature of the nanofiber may be thixotropy, which is a property of the slurry that will have higher liquidity when stirred at a predetermined rotating speed or higher. This feature arises from the nanofiber that will be oriented in the same direction when stirred at a certain speed or higher.

Both cellulose xanthate nanofiber and cellulose nanofiber are nanofibers, but are different in properties. Either can be used, as appropriate, depending on the intended application. It is generally recognized that cellulose nanofiber are thermally stable and hardly undergo thermal decomposition even at 250° C. or higher. It is recognized that modified cellulose nanofiber are less thermally stable and tend to undergo thermal decomposition at about 150 to 200° C. Examples of modified cellulose nanofibers include cellulose xanthate nanofiber, TEMPO-oxidized cellulose nanofiber, carboxymethyl cellulose nanofiber, and phosphorylated cellulose nanofiber. However, cellulose xanthate nanofiber are regenerated into cellulose nanofiber with heat. Thus, cellulose xanthate nanofiber can be used in a hot environment if the regeneration is acceptable.

Applications of cellulose xanthate nanofiber may include resins, rubber compositions, reinforcing materials to be added to starch or the like, gas barrier members, filter members, electronics device members, cosmetics members, thickeners, and dispersants.

In addition, if cellulose xanthate nanofiber are introduced into a hot environment for the generation by, for example, kneading the nanofiber with thermoplastic resins, the resulting cellulose is stable with a greater capacity for resisting heat and the effect of improving strength is exerted, owing to interactions between a component derived from the xanthate group and a thermoplastic resin, as well as owing to the regeneration.

EXAMPLES

Specific examples in which the present invention was carried out will now be described. The following products were used as cellulose materials.

Kraft pulp (NBKP made by Nippon Paper Industries Co., Ltd., α-cellulose content 90 mass %, α-cellulose average degree of polymerization: 1000), hereinafter referred to as "NBKP".

Kraft pulp (LBKP made by Nippon Paper Industries Co., Ltd., α-cellulose content 90 mass %, α-cellulose average degree of polymerization: 950), hereinafter referred to as "LBKP".

Sulfite pulp (NDPT made by Nippon Paper Industries Co., Ltd., α-cellulose content 90 mass %, α-cellulose average degree of polymerization: 830), hereinafter referred to as "NDPT".

Powdered cellulose (powdered cellulose made by Nacalai Tesque, Inc., α-cellulose content: 90 mass %, α-cellulose average degree of polymerization: 600), hereinafter referred to as "powdered cellulose".

Microcrystalline cellulose (Avicel made by Merck, α-cellulose content: 90 mass %, α-cellulose average degree of polymerization: 300), hereinafter referred to as "microcrystalline cellulose".

Nadelholz unbleached kraft pulp (NUKP made by Hyogo Pulp Co., Ltd., α-cellulose content: 75 mass %, α-cellulose average degree of polymerization 1000), hereinafter sometimes referred to as "NUKP".

Laubbolz unbleached kraft pulp (LUKP made by Hyogo Pulp Co., Ltd., α-cellulose content: 75 mass %, α-cellulose average degree of polymerization: 950), hereinafter sometimes referred to as "LUKP".

Example 1

<Alkali Treatment>

NBKP was weighed so that the pulp solid content ("pulp solid content" refers to solids including α-cellulose, lignin and other impurities, and their modifications. The same applies to the following.) was 100 g. The pulp was introduced to a 3 L beaker, 2,500 g of a 8.5 mass % NaOH aqueous solution was added to the beaker, and the alkali treatment was carried out through agitation for three hours at room temperature. The pulp resulting from the alkali treatment was subjected to centrifugal separation (400 mesh filter cloth, 3,000 rpm, 5 minutes) for solid-liquid separation to give a dehydrated product of an alkali cellulose. The NaOH content was about 7.5 mass % and the pulp solid content was 27.4 mass % in the dehydrated product of an alkali cellulose.

The content of NaOH in the dehydrated product of an alkali cellulose was measured in accordance with the procedure described below. About 5 g of the dehydrated product of an alkali cellulose was precisely weighed into a 200 mL conical beaker, to which 20 mL of a 0.5 mol/L sulfuric acid solution was added with a pipette and several drops of a phenolphthalein solution were added. Then, about 150 mL of boiling distilled water was added thereto, a stirring bar was placed therein, and the solution was agitated until the red-violet color disappeared. The resulting solution was subjected to neutralization titration with a 0.1 mol/L sodium hydroxide solution to determine the titration amount. The NaOH content (concentration) was calculated by using the determined titration amount and the equation (1) below.

$$\text{NaOH content (mass \%)} = (0.5 \times 2 \times 20 - 0.1 \times \text{titration amount (ml)}) \times 40 \div 1000 \div \text{amount of sampled alkali cellulose} \times 100 \quad (1)$$

The pulp solid content was measured in accordance with the procedure described below. The alkali cellulose, as it was left in the conical beaker after the foregoing measurement of the NaOH content, was filtered through a pro-weighed glass fiber filter paper (GS-25 made by Advantec), and the cellulose component was thoroughly washed with distilled water. After washed, the cellulose along with the filter paper was dried in a dryer at 105° C. for three hours and then weighed. The pulp solid content was calculated by using the measured weight and the equation (2) below.

$$\text{Pulp solid content (mass \%)} = (\text{absolute dry weight} - \text{filter paper weight}) \div \text{amount of sampled alkali cellulose} \times 100 \quad (2)$$

<Xanthogenation>

The dehydrated product of an alkali cellulose, as prepared in the above-described step, was weighed so that the pulp solid content was 10 g and introduced into an eggplant-shaped flask. Into the eggplant-shaped flask, 3.5 g of carbon disulfide (35 mass % relative to the pulp solid content) was introduced to cause a xanthogenation and allowed to proceed for about 4.5 hours at room temperature.

<Measuring Cellulose Content in Cellulose Xanthate>

After wet cellulose xanthate was prepared in the abode-described xanthogenation step, the regeneration step was carried out by precisely weighing 2 g of the wet cellulose xanthate, adding 50 mL of distilled water, thoroughly dispersing the cellulose xanthate in the water, and adding 4 mL of 2M hydrochloric acid to turn xanthate groups back into hydroxyl groups. The wet cellulose resulting from the regeneration was filtered through a pro-weighed glass fiber filter paper (GS-25 made by Advantec) and thoroughly washed with distilled water to remove impurities, alkali, and carbon disulfide. Then, the cellulose was absolutely dried to remove its moisture, the mass of the resulting product consisting of cellulose only was measured, and the cellulose content relative to the wet cellulose xanthate was calculated.

<Measuring Degree of Xanthation>

The Bredee method was used to determine the average degree of xanthation of the cellulose xanthate to be 29.5 mol %. Note that this degree of xanthation represents a value covering all the (—OH) groups at C-2, C-3 positions and C-6 of the cellulose. The following procedure for the Bredee method was conducted. About 1.5 g of cellulose xanthate was precisely weighed into a 100 mL beaker, and 40 mL of a saturated ammonium chloride solution (SOC) was added thereto. The sample was crushed and mixed well with a glass rod, left for about 15 minutes, filtered through a glass fiber filter paper (GS-25 made by Advantec), and then washed well with a saturated ammonium chloride solution. The sample along with the glass fiber filter paper was placed into a 500 mL tall beaker, and 50 mL of a 0.5 M sodium hydroxide solution (5° C.) was added and agitated. After being left for 15 minutes, the sample was neutralized with a 1.5 M acetic acid (phenolphthalein indicator). After neutralized, the sample was agitated well with 250 mL of distilled water added, and then 10 mL of a 1.5 M acetic acid and 10 mL of a 0.05 mol/L iodine solution were added by using a pipette. The resulting solution was titrated with a 0.05 mol/L sodium thiosulfate solution (1% starch solution indicator). The degree of xanthation was calculated by using the titration amount of a sodium thiosulfate solution, the cellulose content in the sample, and the equation (3) below. The degree of xanthation represents the ratio of hydroxyl groups substituted with xanthate groups to original hydroxyl groups in a cellulose fiber. The degree of substitution is expressed as the equation (4) below based on the degree of xanthation.

$$\text{Degree of xanthation (mol \%)} = (0.05 \times 10 \times 2 - 0.05 \times \text{titration amount of sodium thiosulfate solution (mL)}) \div 1000 \div (\text{amount of cellulose in sample (g)}/162.1) \times 100 \quad (3)$$

$$\text{Degree of substitution} = \text{degree of xanthation (mol \%)}/\{(1/3) \times 100 \text{ (mol \%)}\} = \text{degree of xanthation}/33.3 \quad (4)$$

<Verifying Crystallinity Retained in Cellulose Xanthate>

The FT-IR was measured on the cellulose that had been obtained for measuring the cellulose content in the cellulose xanthate. Consequently, peaks corresponding to cellulose I were observed.

<Defibration>

The cellulose xanthate prepared in the above-described xanthogenation was taken to weigh 0.25 g of the cellulose solid content, and was agitated with 50 mL of distilled water added to give slurry containing 0.5 mass % cellulose solids. The slurry was defibrated with a homogenizer (AM-7 made by Nihonseiki Kaisha Ltd.) at 17,000 rpm for 30 minutes to give cellulose xanthate nanofiber.

<SEM Photograph>

Figure 2:
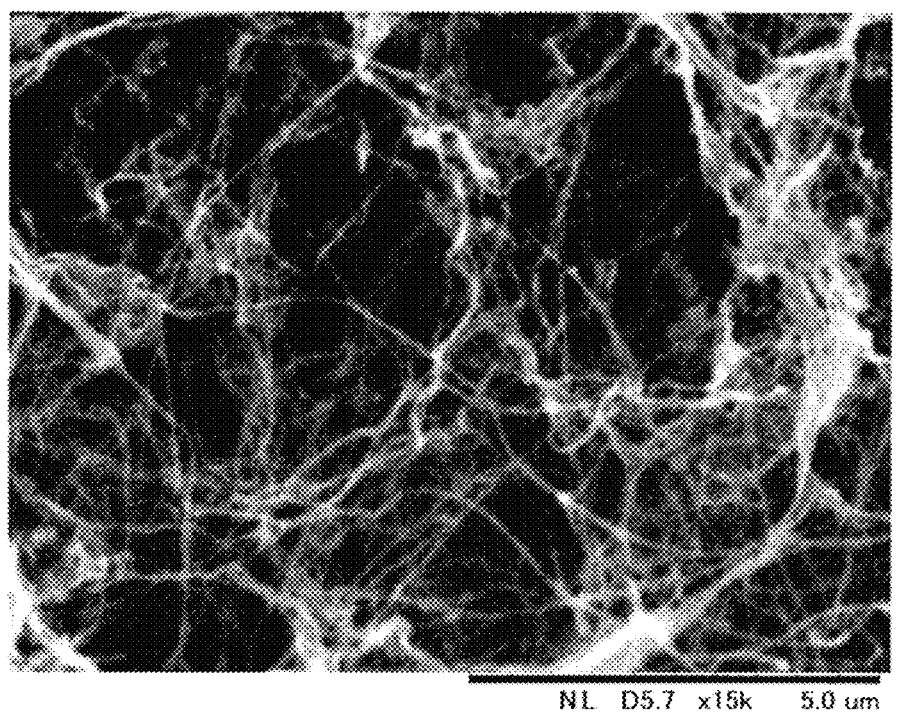
FIG. 2 is another photograph taken under the same conditions as those of the photograph in FIG. 1.

Upon completion of the defibration, the cellulose xanthate was freeze-dried and observed by the SEM, which showed fibers having a fiber diameter of 4 to 100 nm. The obtained photographs are shown in FIGS. 1 and 2. The magnification was 15,000. Many of the observed fibers were several tens of micrometers long. Hence, xanthate nanofiber presumably having a high aspect ratio was visually recognized.

<Degree of Defibration into Nanofiber

To the cellulose xanthate nanofiber in a slurry state (cellulose solid content 0.5 mass %) having undergone the defibration as above, distilled water was added so that the slurry concentration reaches 0.1 mass %. The slurry was centrifuged (10,000 rpm, 20 minutes) to precipitate undefibrated fibers. The supernatant, which constituted nanofiber slurry, was separated and transferred to an Erlenmeyer flask, while the precipitated undefibrated fibers were centrifuged again with distilled water added, and then the undefibrated fibers were washed. The undefibrated fibers were transferred to a crucible and absolutely dried, and the dried undefibrated fibers were weighed. The production yield of generated cellulose xanthate nanofiber was determined by using the weight of undefibrated fibers, the content of cellulose in defibrated cellulose xanthate, and the equation (5) below.

Production yield of cellulose xanthate nanofiber (mass %)=(cellulose content in cellulose xanthate−weight of undefibrated fibers)÷(cellulose content in cellulose xanthate)×100       (5)

A sample was taken and placed into a 500 mL tall beaker from the supernatant of the cellulose xanthate nanofiber that had been transferred to the Erlenmeyer flask as described above. 50 mL of a 0.5 M sodium hydroxide solution (5° C.) was added and agitated, and the Bredee method was used to determine the average degree of xanthation to be 28.5 mol %. Since the value was unchanged from before the defibration, and iodine only reacts with a xanthate group under the Bredee method, it was verified that xanthate groups were not detached after the defibration.

<Method for Measuring Fiber Length>

Nanofiber slurry diluted with water to about 0.1 mass % was put into a centrifuge tube and centrifuged at 9,000 rpm for 10 minutes. The supernatant of the centrifuged sample was diluted to a slurry concentration of about 0.05 mass %, and was mixed with ethanol in a 1:1 ratio by volume. 20 μL of the liquid mixture was added dropwise onto a glass slide and then air-dried. Safranin, which is a staining solution, was added to the dried mixture dropwise, and the mixture was left for about one minute, washed with running water, air dried again, and then observed by microscopy. An image taken at 1,000× magnification by microscopy was divided into 100 sections. One of nanofiber included in a single section (35 μm×26 μm) was selected, and the length of the fiber was measured (100 fibers in total).

<Method for Measuring Fiber Diameter>

Nanofiber slurry diluted with water to about 0.1 mass % was put into a centrifuge tube and centrifuged at 9,000 rpm for 10 minutes. The supernatant of the centrifuged sample was diluted to a slurry concentration of about 0.03 mass %, and was mixed with tert-butyl alcohol in a 8:2 ratio by volume (20% tert-butyl alcohol contained). The liquid mixture was freeze-dried and was observed by the SEM. From an image taken at 15,000× magnification by the SEM, 100 nanofibers were selected and their fiber diameters were measured. An average was taken from either of the fiber diameters and fiber lengths of the 100 fibers measured. On the basis of the measured fiber diameters and fiber lengths, aspect ratios (fiber length/fiber diameter) were calculated as 15 to 5,000.

Results of the foregoing are shown in Tables 1 and 2. In Example 1, both the alkali treatment and the xanthogenation adequately proceeded, and the defibration produced nanofiber that was well defibrated.

TABLE 1

| | | Cellulose alkalization | | | | | Average sulfide degree | |
| --- | --- | --- | --- | --- | --- | --- | --- | --- |
| | Feedstock | Concentration of alkali solution | Temperature | Alkali amount after dehydration | Cellulose Amount after dehydration | Sulfurization Added $CS_2$ % (relative to pulp mass) | (relative to moles of OH groups in glucose) | Defibration method |
| Example 1 | NBKP (kraft pulp) | 8.5 mass % | RT | 7.5 | 27.4 | 35 mass % | 29.5 mol % | Homogenizer |
| Example 5 | NBKP (kraft pulp) | 8.5 mass % | | 7.5 | 27.4 | 12 mass % | 10.8 mol % | Homogenizer |
| Example 6 | NBKP (kraft pulp) | 8.5 mass % | | 7.5 | 27.4 | 35 mass % | 29.5 mol % | Planetary ball mill |
| Example 7 | LUKP (kraft pulp) | 8 mass % | | 7.1 | 28.6 | 24 mass % | 25.2 mol % | Homogenizer |
| Example 8 | NUPT (sulfite pulp) | 8.5 mass % | | 7.4 | 30 | 12 mass % | 11.4 mol % | Homogenizer |
| Example 9 | Powdered cellulose (laubhholz) | 8 mass % | | 7.4 | 19 | 35 mass % | 26.1 mol % | Homogenizer |
| Example 10 | Microcrystalline cellulose (Avicel) | 8 mass % | | 7.4 | 20.1 | 35 mass % | 25.3 mol % | Homogenizer |
| Example 11 | NBKP (kraft pulp) | 8.5 mass % | | 7.5 | 27.4 | 35 mass % | 29.5 mol % | Homogenizer |
| Example 13 | NBKP (kraft pulp) | 4 mass % | | 3.5 | 33.8 | 35 mass % | 13.9 mol % | Homogenizer |
| Example 14 | NBKP (kraft pulp) | 5 mass % | | 4.2 | 34.6 | 35 mass % | 17.5 mol % | Homogenizer |
| Example 15 | NBKP (kraft pulp) | 9 mass % | | 8 | 27 | 35 mass % | 32.9 mol % | Homogenizer |
| Example 16 | NBKP (kraft pulp) | 9 mass % (KOH) | | 8 | 35.3 | 35 mass % | 28.7 mol % | Homogenizer |
| Example 17 | NBKP (kraft pulp) | 8.5 mass % | | 7.5 | 27.4 | 35 mass % | 29.5 mol % | Homogenizer after NH4Cl treatment |
| Example 18 | NBKP (kraft pulp) | 8.5 mass % | | 7.5 | 27.4 | 35 mass % | 29.5 mol % | Homogenizer after wash & TBAII |
| Comparative Example 4 | NBKP (kraft pulp) | 11 mass % | | 10.2 | 19.1 | 35 mass % | 35.8 mol % | Homogenizer |
| Comparative Example 5 | NBKP (kraft pulp) | 10 mass % | | 9.2 | 20.3 | 35 mass % | 32.7 mol % | Homogenizer |

TABLE 1-continued

| | | | | | | | | |
|---|---|---|---|---|---|---|---|---|
| Comparative Example 6 | NBKP (kraft pulp) | 3 mass % | | 2.5 | 36.4 | 35 mass % | 9.7 mol % | Homogenizer |
| Comparative Example 7 | NBKP (kraft pulp) | 8.5 mass % | | 7.5 | 27.4 | 6 mass % | 9.4 mol % | Homogenizer |
| Comparative Example 8 | NBKP (kraft pulp) | 8.5 mass % | | 7.5 | 27.4 | 70 mass % | 41.2 mol % | Homogenizer |
| Example 19 | NBKP (kraft pulp) | 7 mass % | 4 °C. | 6.1 | 26.4 | 35 mass % | 21.2 mol % | Homogenizer |
| Reference Example 2 | NBKP (kraft pulp) | 8 mass % | 4 °C. | 7.1 | 25.7 | 35 mass % | 26.7 mol % | Homogenizer |

| | | Xanthate CNF evaluation | | | | |
|---|---|---|---|---|---|---|
| | Resulting product | Production yield of nanofiber % | Retained crystallinity | Average fiber diameter | Average fiber length | Nanofiber sulfide degree | Polymerization degree |
| Example 1 | Nanofibers produced | 91.70% | Cellulose type-I | 26.3 nm | 7.33 μm | 28.5 mol % | 400 |
| Example 5 | Nanofibers produced | 85.20% | Cellulose type-I | 24.8 nm | 7.84 μm | 7.6 mol % | 400 |
| Example 6 | Nanofibers produced | 88.30% | Cellulose type-I | | | 27.5 mol % | 400 |
| Example 7 | Nanofibers produced | 92.10% | Cellulose type-I | 17.2 nm | 5.01 μm | 22.1 mol % | 420 |
| Example 8 | Nanofibers produced | 80.30% | Cellulose type-I | 26.1 nm | 6.89 μm | 9.6 mol % | 410 |
| Example 9 | Nanofibers produced | 90.20% | Cellulose type-I | | | 23.1 mol % | 390 |
| Example 10 | Nanofibers produced | 87.40% | Cellulose type-I | | | 21.6 mol % | 300 |
| Example 11 | Nanofibers produced | 92.30% | Cellulose type-I | 23.3 nm | 7.01 μm | 0.1 mol % | 400 |
| Example 13 | Nanofibers produced | 60.10% | Cellulose type-I | 27.9 nm | 8.11 μm | 10.1 mol % | |
| Example 14 | Nanofibers produced | 71.10% | Cellulose type-I | | | 14.7 mol % | |
| Example 15 | Nanofibers produced | 92.20% | Cellulose type-I | 22.1 nm | 6.54 μm | 30.8 mol % | |
| Example 16 | Nanofibers produced | 72.70% | Cellulose type-I | | | 23.5 mol % | |
| Example 17 | Nanofibers produced | 72.10% | Cellulose type-I | | | 26.5 mol % | |
| Example 18 | Nanofibers produced | 73.60% | Cellulose type-I | | | 24.5 mol % | |
| Comparative Example 4 | Gel-like undefibrated fiber | 0.00% | Cellulose type-II | | | | |
| Comparative Example 5 | Gel-like undefibrated fiber | 0.00% | Cellulose type-II | | | | |
| Comparative Example 6 | Undefibrated pulp | 24.10% | Cellulose type-I | | | | 830 |
| Comparative Example 7 | Undefibrated pulp | 25.10% | Cellulose type-I | | | | 400 |
| Comparative Example 8 | Nanofiber Gel-like undefibrated fiber | 40.10% | Cellulose type I and II mixed | | | | 400 |
| Example 19 | Nanofibers produced | 81.20% | Cellulose type-I | | | | |
| Reference Example 2 | Gel-like undefibrated fiber | 0.00% | Cellulose type-II | | | | |

<Identifying Change in Crystalline Structure in Cellulose Xanthate>

Examples 2 to 4, Comparative Examples 1 to 3, Reference Example 1

Figure 3:
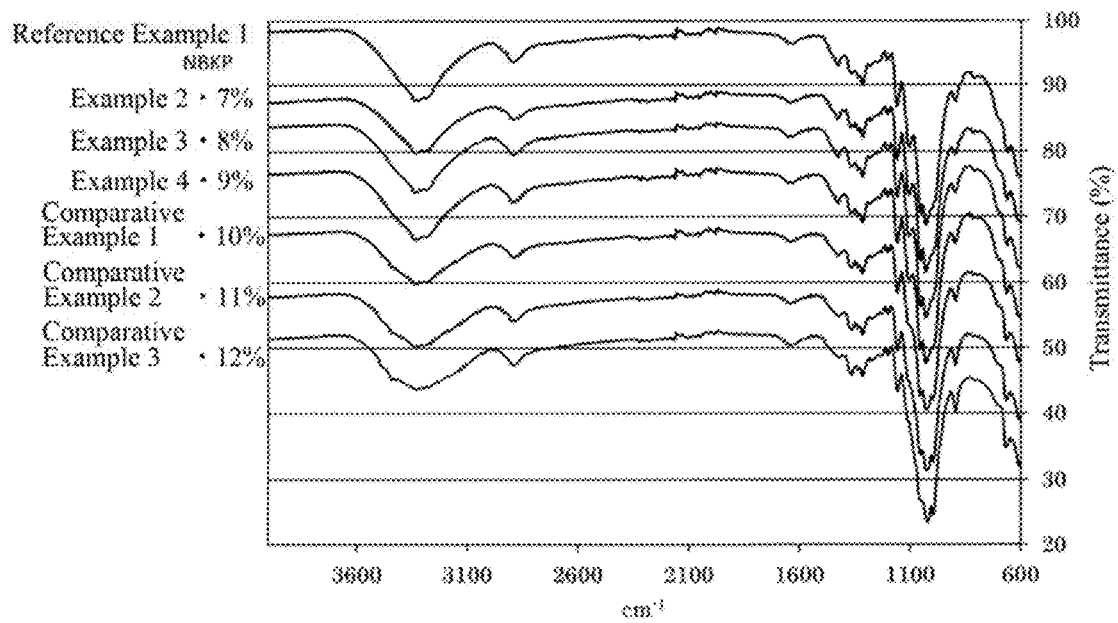
FIG. 3 is a result of FT-IR measurement with different concentrations of a sodium hydroxide solution according to examples.
Figure 4:
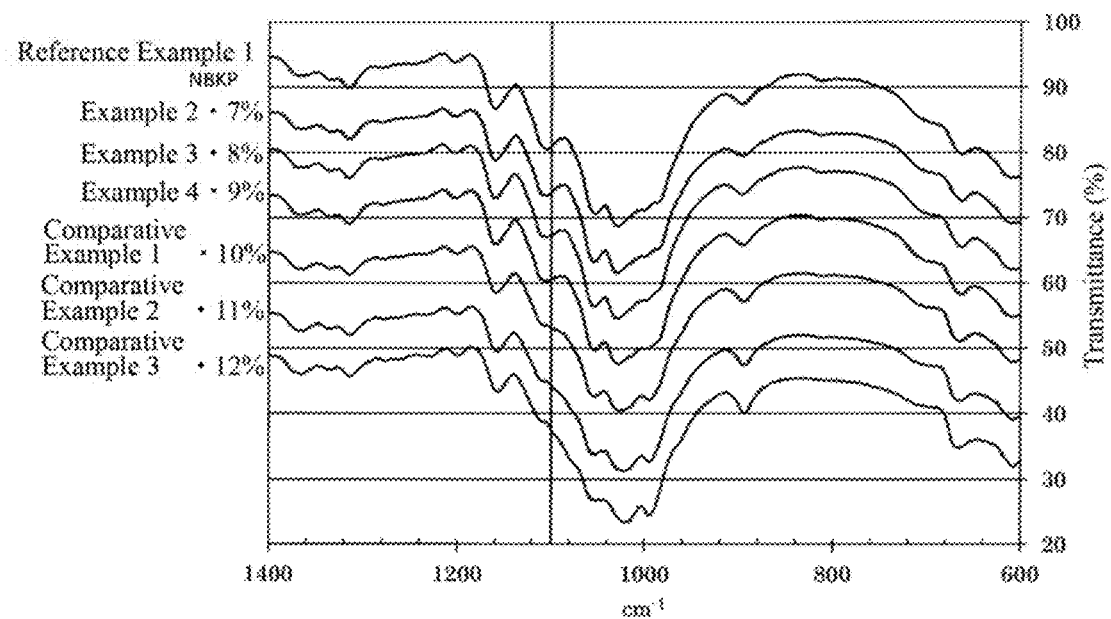
FIG. 4 is a partial enlarged view of FIG. 3.

The same procedure as in Example 1 was conducted to regenerate the obtained cellulose xanthate into cellulose on which the FT-IR was measured before defibration, except that the concentration of a sodium hydroxide solution for alkali treatment was 7 mass % (Example 2), 8 mass % (Example 3), 9 mass % (Example 4), 10 mass % (Comparative Example 1), 11 mass % (Comparative Example 2), and 12 mass % (Comparative Example 3) instead of 8.5 mass % in Example 1. FIG. 3 shows the result and FIG. 4 shows an enlarged region around 1,100 cm$^{-1}$. For comparison, Reference Example 1 is also shown representing the FT-IR measurement on the original NBKP.

In cellulose I, a peak around 1110 cm$^{-1}$ (near the vertical line in the IR spectrum) attributed to C—OH and a peak around 1060 cm$^{-1}$ attributed to C—O—C are seen, and a peak around 3300 cm$^-$ attributed to OH stretching vibration is relatively sharp. The NBKP in Reference Example has all of these features. In contrast, in cellulose II, the peak around 1110 cm$^{-1}$ attributed to C—OH disappears, the peak around 1060 cm$^{-1}$ attributed to C—O—C becomes smaller, and the peak around 3600 to 3100 cm$^{-1}$ attributed to OH stretching vibration becomes broad. Referring to FIGS. 3 and 4 for identifying these features, peaks around 1060 cm$^{-1}$ and peaks around 1110 cm$^-$ are observed in examples having a sodium hydroxide solution at a concentration of 9 mass % or less (Examples 2 to 4), but these peaks are hardly observed in examples having a concentration of 10 mass % or higher. In addition, peaks around 3300 cm$^{-1}$ in examples at a concentration of 10 mass % or higher almost lost the sharpness to become broad curves. Consequently, it was verified from these IR spectra that a concentration of 9 mass % or less resulted in satisfactory cellulose nanofiber produced by defibrating cellulose xanthate, while a concentration of 10 mass % or higher resulted in cellulose II, creating features improper as cellulose nanofiber.

Example 5

The same procedure as in Example 1 was conducted except that the amount of carbon disulfide introduced in the xanthogenation was reduced to 1.2 g (12 mass % relative to the pulp solid content). Although the average degree of xanthation was decreased to 10.8 mol %, nanofiber was obtained after defibration.

Example 6

The same procedure as in Example 1 was conducted except that a planetary ball mill (P-6 made by FRITSCH) was used instead of a homogenizer to carry out the defibration at 500 rpm (the number of revolutions) for 30 minutes.

It was verified that nanofiber was successfully obtained in spite of the different defibration method.

Example 7

The same procedure as in Example 1 was conducted except that LBKP was used as raw material pulp, the concentration of a sodium hydroxide solution was changed to 8 mass %, and the amount of added carbon disulfide was changed to 2.4 g (24 mass % relative to the pulp solid content). Although the average degree of xanthation of cellulose xanthate was decreased to 25.2 mol % defibration occurred successfully to give nanofiber.

Example 8

The same procedure as in Example 1 was conducted except that NDPT (sulfite pulp) was used as raw material pulp and the amount of added carbon disulfide was reduced to 1.2 g (12 mass % relative to the pulp solid content). Although the average degree of xanthation was decreased to 11.4 mol %, defibration occurred successfully to give nanofiber.

Example 9

The same procedure as in Example 1 was conducted except that powdered cellulose was used as raw material pulp and the concentration of a sodium hydroxide solution was changed to 8 mass %. Although the average degree of xanthation of cellulose xanthate was decreased to 26.1 mol %, defibration occurred successfully to give nanofiber.

Example 10

The same procedure as in Example 9 was conducted except that microcrystalline cellulose was used as raw material pulp. Although the average degree of xanthation of cellulose xanthate was decreased to 24.7 mol %, defibration occurred successfully to give nanofiber.

Example 11

The cellulose xanthate prepared in Example 1 was weighed and put into a beaker, and distilled water was added so that the cellulose xanthate was dispersed therein. The cellulose xanthate was filtered through a glass fiber filter paper (GS-25 made by Advantec) and thoroughly washed with distilled water to remove impurities, alkali, and carbon disulfide. All the washed cellulose xanthate was collected, and distilled water was added to give a washed slurry with the cellulose solid content of 0.5 mass %. The washed slurry contained NaOH at a concentration less than the lower detection limit (0.1 mg/L) and the pH was 7.8. The washed slurry was defibrated with a homogenizer (AM-7 made by Nihonseiki Kaisha Ltd.) at 17,000 rpm for 30 minutes to give cellulose xanthate nanofiber. The obtained product was used as cellulose xanthate nanofiber in the following measurements in Example 11.

Figure 5:
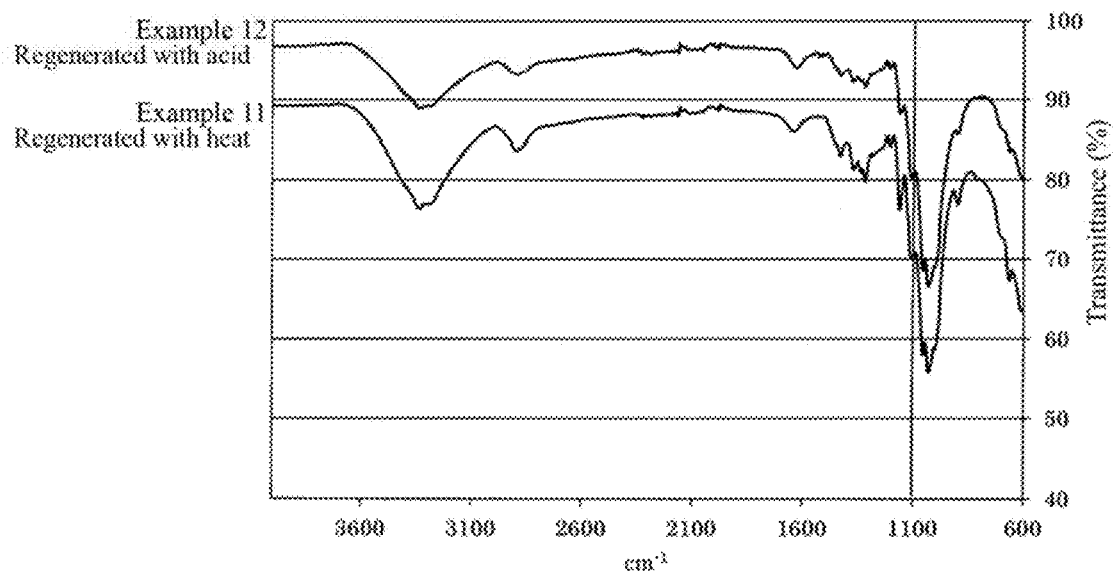
FIG. 5 is a result of FT-IR measurement on heating regenerating cellulose nanofiber according to Example 11 and acid regenerating cellulose nanofiber according to Example 12.

The obtained nanofiber was subjected to regeneration (heating treatment) for one hour in a 40° C. environment. After the heating treatment, the slurry was freeze-dried to give dried nanofiber, which were then measured by FT-IR. The FT-IR measurement produced an IR spectrum corresponding to cellulose I. A sample was taken from the heated slurry and put into a 500 mL tall beaker. The sample with 50 mL of a 0.5 M sodium hydroxide solution (5° C.) added was agitated, and the Bredee method was used to determine the average degree of xanthation, which was found to be less than the lower measurement limit of 0.1 mol %. Accordingly, it was verified that xanthate groups were substituted with hydroxyl groups through the heating. FIG. 5 shows results of the FT-ER measurement. The average degree of polymerization after the heating was 400, unchanged from before the heating.

Figure 6:
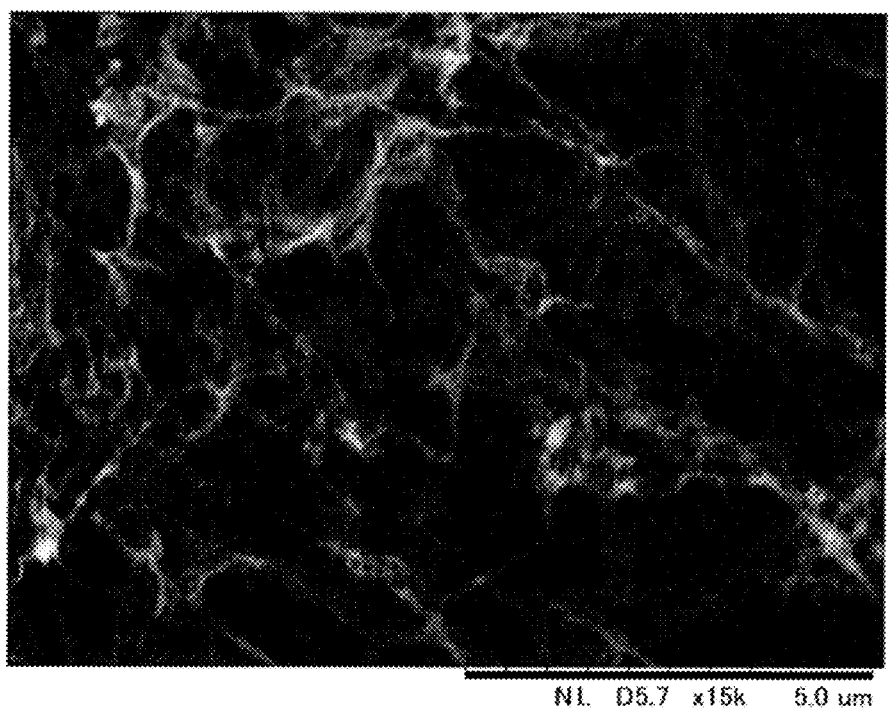
FIG. 6 is an SEM photograph of cellulose nanofiber regenerated with heat according to Example 11 taken at 15,000× magnification.

FIG. 6 shows an SEM photograph of the cellulose nanofiber produced through the regeneration. The resulting cellulose nanofiber kept almost the same fiber diameters and fiber lengths as those of the cellulose xanthate nanofiber measured prior to the regeneration (the average fiber diameter and fiber length were 25.8 nm and 7.28 μm, respectively), and thus it was verified that the resulting cellulose nanofiber maintained the form of nanofiber.

Example 12

After the cellulose xanthate was washed in Example 11, the obtained nanofiber slurry was subjected to regeneration (acid treatment), being immersed in a dilute hydrochloric acid for 30 minutes. The average degree of xanthation after the acid treatment was determined to be less than the lower measurement limit of 0.1 mol %. Accordingly, it was verified that xanthate groups were substituted with hydroxyl groups through the acid treatment. The obtained product was measured by FT-IR. FIG. 5 shows the result along with that of the heating treatment. Both of the products regenerated through heating and acid treatment showed IR spectra corresponding to cellulose I, and thus it was verified that the resulting cellulose nanofiber maintained the crystalline structure of cellulose I. The average fiber diameter and average fiber length were 25.0 nm and 6.98 μm, respectively.

Examples 13 to 15

The same procedure as in Example 1 was conducted to prepare nanofiber except that the alkali concentration was changed to 4 mass % (Example 13), 5 mass % (Example 14), and 9 mass % (Example 15). The results are shown in Table 1.

<Different Cationic Species>

Example 16

The same procedure as in Example 1 was conducted except that potassium hydroxide was used as an alkali metal salt instead of sodium hydroxide and the concentration was changed to 9 mass %. Nanofiber was obtained through defibration of cellulose xanthate having an average degree of xanthation of 28.7 mol % (production yield of nanofiber 72.7%, nanofiber degree of xanthation: 23.5 mol %).

Example 17

The cellulose xanthate prepared in Example 1 was weighed and put into a beaker, and a saturated ammonium chloride solution was added, so that the cellulose xanthate was dispersed therein. The cellulose xanthate was filtered through a glass fiber filter paper (GS-25 made by Advantec) and thoroughly washed with distilled water to remove impurities, alkali, and carbon disulfide. All the washed cellulose xanthate was collected and subjected to defibration by using the same procedure as in Example 1 to give cellulose xanthate nanofiber. The production yield of nanofiber was 72.1%, and the nanofiber degree of xanthation was 26.5 mol %.

Example 18

The cellulose xanthate prepared in Example 1 was weighed and put into a beaker, and distilled water was added so that the cellulose xanthate was dispersed therein. The cellulose xanthate was filtered through a glass fiber filter paper (GS-25 made by Advantec) and thoroughly washed with distilled water to remove impurities, alkali, and carbon disulfide. All the washed cellulose xanthate was collected, and a 5 wt % tetrabutylammonium hydride (TBAH) solution was added to give a slurry with 1 mass % cellulose solids, which was then agitated at room temperature for one hour. The agitated slurry was filtered through a glass fiber filter paper again and thoroughly washed with distilled water. All the washed cellulose xanthate was collected and subjected to defibration by using the same procedure as in Example 1 to give cellulose xanthate nanofiber. The production yield of nanofiber was 73.6%, and the nanofiber degree of xanthation was 24.5 mol %.

Comparative Example 4

The same procedure as in Example 1 was conducted except that the concentration of a sodium hydroxide solution was changed to 11 mass %. The average degree of xanthation of cellulose xanthate was 35.8 mol %, and the defibration step gave a gel-like undefibrated fiber without xanthate nanofiber. The prepared cellulose xanthate was regenerated, dried, and then measured by the FT-IR, which showed that the cellulose had been turned into cellulose II.

Comparative Example 5

The same procedure as in Comparative Example 1 was conducted except that the concentration of a sodium hydroxide solution was changed to 10 mass %. The average degree of xanthation of cellulose xanthate was 32.7 mol %, and a gel-like undefibrated fiber wad given as in Comparative Example 1.

Comparative Example 6

The same procedure as in Example 1 was conducted except that the concentration of a sodium hydroxide solution was changed to 3 mass %. The average degree of xanthation of cellulose xanthate was 9.7 mol %, and the cellulose was not defibrated into nanofiber during the defibration step, with the result that fibers remaining in the pulp state were given.

Comparative Example 7

The same procedure as in Example 1 was conducted except that the amount of added carbon disulfide was changed to 6 g (6 mass % relative to the pulp solid content). The average degree of xanthation of cellulose xanthate was 9.4 mol %, and defibration slightly proceeded to give nanofiber but the cellulose xanthate was not fully turned into nanofiber, with the result that some fibers remained undefibrated.

Comparative Example 8

The same procedure as in Example 1 was conducted except that the amount of added carbon disulfide was changed to 70 g (70 mass % relative to the pulp solid content). The average degree of xanthation of cellulose xanthate was 41.2 mol % and nanofiber was obtained as in Example 1, but they were mixed with gel-like undefibrated fibers.

<Complementary Experiment in Special Temperature Environment>

Example 19

The same procedure as in Example 1 was conducted except that the concentration of a sodium hydroxide solution was 7 mass % and the operating temperature was changed to 4° C. Although the production yield of nanofiber was a little lower, production of xanthate nanofiber was confirmed.

Reference Example 2

The same procedure as in Example 19 was conducted except that the concentration of a sodium hydroxide solution was 8 mass %, with the result that the gel-like fibers remained undefibrated with no nanofiber produced.

<Energy Required for Defibration in Comparison with Conventional Methods>

Example 20

The cellulose xanthate prepared in Example 1 was weighed and put into a 5 L beaker with handle, and distilled water was added so that the slurry concentration was about 5% and the cellulose xanthate was dispersed therein. The slurry was dehydrated with a centrifugal dehydrator (H-110A made by KOKUSAN Co., Ltd., 400 mesh filter cloth), and thoroughly washed with distilled water being added to remove impurities, alkali, and carbon disulfide. All the washed cellulose xanthate was collected, and distilled water was added to give 10 kg of a slurry with the cellulose solid content of 0.5 mass %. The slurry was subjected to three passes of defibration by using a high-pressure homogenizer (H20 type, Sanwa Engineering Ltd.) at a pressure of 38 to 52 MPa and a flow rate of 2.5 L/minute. Table 2 shows the production yield of nanofiber determined upon completion of each pass. The average degree of xanthation of cellulose xanthate after each pass was 30 to 31.8 mol %. Defibration occurred successfully upon the third pass to give nanofiber.

In Example 20, the nanofiber slurry was measured with respect to the production yield of nanofiber, the average fiber length, and the average fiber diameter upon completion of every pass for repeated defibrations. Table 2 shows the results. In Example 20, larger undefibrated fibers were observed after pass 1, when the production yield of nanofiber was lower. Details of the example are shown in Table 3.

TABLE 2

| | Example 20 | | | Example 21 | | | Example 22 | | |
|---|---|---|---|---|---|---|---|---|---|
| | production yield of nanofiber | Avergae fiber diameter (nm) | Average fiber length (μm) | production yield of nanofiber | Avergae fiber diameter (nm) | Average fiber length (μm) | production yield of nanofiber | Avergae fiber diameter (nm) | Average fiber length (μm) |
| Pass 1 | 77.70% | 205 | 52 | 40.70% | | | — | | |
| Pass 2 | 95.90% | 55 | 15 | 89.60% | 104 | 27 | 51.40% | | |
| Pass 3 | 98.50% | 34 | 10 | 98.90% | 31 | 9 | 73.70% | 229 | 57 |
| Pass 4 | | | | | | | 88.40% | 114 | 29 |
| Pass 5 | | | | | | | 95.00% | 62 | 17 |

TABLE 3

| | Feedstock | Cellulose alkalization | | | | Sulfurization Added CS$_2$ % (relative to pulp mass) | Average sulfide degree (relative to moles of OH groups in glucose) | Defibration method |
|---|---|---|---|---|---|---|---|---|
| | | Concentration of alkali solution | Temperature | Alkali amount after dehydration | Cellulose Amount after dehydration | | | |
| Example 20 | NBKP (kraft pulp) | 8.5 mass % | RT | 7.5 | 25.3 | 35 mass % | 31.8 mol % | High-pressure homogenizer |
| Example 21 | NBKP (kraft pulp) | 8.5 mass % | | 7.5 | 28 | 35 mass % | 31.8 mol % | High-pressure homogenizer |
| Example 22 | NBKP (kraft pulp) | 8.5 mass % | | 7.5 | 26.4 | 35 mass % | 31.4 mol % | Ultrasonic dispersing machine |
| Comparative Example 9 | NBKP (kraft pulp) | 8.5 mass % | | 7.5 | 27.4 | 0 mass % | 0 mol % | High-pressure homogenizer |
| Example 23 | NBKP (kraft pulp) | 8.5 mass % | | 7.5 | 27.4 | 35 mass % | 29.5 mol % | Ammonia added then homogenizer |
| Example 24 | NBKP (kraft pulp) | 8.5 mass % | | 7.6 | 25.3 | 35 mass % | 24.8 mol % | Homogenizer |
| Example 25 | LUKP (kraft pulp) | 8.5 mass % | | 7.4 | 24.1 | 35 mass % | 25.8 mol % | Homogenizer |
| Example 26 | NBKP (kraft pulp) | 8.5 mass % | | 7.5 | 25.9 | 35 mass % | 31.7 mol % | Homogenizer in organic solvent |

| | Xanthate CNF evaluation | | | | | | |
|---|---|---|---|---|---|---|---|
| | Resulting product | Production yield of nanofiber % | Retained crystallinity | Average fiber length | Average fiber length | Nanofiber sulfide degree | Polymerization degree |
| Example 20 | Nanofiber generated | 98.50% | Cellulose type-I | 10.2 nm | 6.38 μm | 30.7 mol % | |
| Example 21 | Nanofiber generated | 98.90% | Cellulose type-I | 12.6 nm | 5.78 μm | 30.0 mol % | |
| Example 22 | Nanofiber generated | 95.00% | Cellulose type-I | 15.4 nm | 6.01 μm | 28.7 mol % | |
| Comparative Example 9 | Undefi-brated pulp | 3.80% | Cellulose type-I | | | | |
| Example 23 | Nanofiber generated | 71.70% | Cellulose type-I | | | 25.5 mol % | |
| Example 24 | Nanofiber generated | 81.40% | Cellulose type-I | 20.4 nm | 7.15 μm | 22.4 mol % | |
| Example 25 | Nanofiber generated | 83.40% | Cellulose type-I | 16.8 nm | 5.14 μm | 22.6 mol % | |
| Example 26 | Nanofiber generated | 80.60% | Cellulose type-I | 25.4 nm | 7.31 μm | 28.9 mol % | |

Example 21

In Example 20, all the washed cellulose xanthate was collected, and distilled water was added to change the concentration of cellulose solids to 1 mass % in 10 kg of slurry. The slurry was subjected to three passes of defibration by using the same high-pressure homogenizer at a pressure of 34 to 42 MPa and a flow rate of 2.5 L/minute. Table 3 shows the production yield of nanofiber determined upon completion of each pass. The average degree of xanthation of cellulose xanthate after each pass was 30.0 to 31.8 mol %. Defibration occurred successfully to give nanofiber.

Example 22

The slurry weighing 10 kg containing 0.5 mass % cellulose solids, as prepared in Example 20, was subjected to a total of five passes of defibration by using an ultrasonic dispersing machine (UIP2000hd made by Hielscher) at a flow rate of 2.5 L/minute and an output of 2.34 to 2.48 kW. Table 3 shows the production yield of nanofiber determined upon completion of each pass. The average degree of xanthation of cellulose xanthate was 28.7 mol % upon completion of the fifth pass. Thus, defibration occurred successfully upon the fifth pass to give nanofiber.

Comparative Example 9

The alkali cellulose prepared in Example 1 was weighed and put into a 5 L beaker with handle, and distilled water was added so that the slurry concentration was about 5% and the cellulose xanthate was dispersed therein. The slurry was dehydrated with a centrifugal dehydrator (H-110A made by KOKUSAN Co., Ltd., 400 mesh filter cloth), and thoroughly washed with distilled water being added to remove alkali. All the washed alkali cellulose was collected, and distilled water was added to give 10 kg of a slurry with the cellulose solid content of 0.5 mass %. The slurry was subjected to three passes of defibration by using a high-pressure homogenizer (H20 type, Sanwa Engineering Ltd.) at a pressure of 38 to 52 MPa and a flow rate of 2.5 L/minute. However, the cellulose was not defibrated into nanofiber and the fibers remained in the pulp state. Table 4 shows production yields of nanofiber determined when the respective defibration passes were finished. It was verified that the alkali cellulose having undergone no xanthogenation was hardly defibrated under the same defibrating pressure as in Example 17 or 18.

TABLE 4

| Number of passes | Production yield of nanofiber % |
|---|---|
| Pass 1 | 1.5% |
| Pass 2 | 2.2% |
| Pass 3 | 3.8% |

<Verifying Effects of Washing after Xanthogenation>

Examples 11a to 11g

The cellulose xanthate produced through xanthogenation in Example 11 was washed in different degrees to find how these degrees affect the effect of facilitating defibration. First, distilled water was added to the cellulose xanthate that had undergone xanthogenation but not washing to prepare 50 mL of 0.5 mass % unwashed slurry. The unwashed slurry was centrifuged at 3,000 rpm for 10 minutes, and then the resulting supernatant was taken with a pipette. 10 mL of the taken supernatant was titrated with 0.01 N sulfuric acid by using phenolphthalein as an indicator. The NaOH concentration was determined to be 0.41 g/L by calculating an average of three neutralization titrations. A pH meter indicated a pH of 11.2 in the supernatant.

The production yield of nanofiber was measured by using the following procedure. First, distilled water was added to the cellulose xanthate to prepare 50 mL of slurry having a concentration of 0.5%, which was then centrifuged at 3,000 rpm for 10 minutes. After the centrifugation, some of the supernatant was taken and water was added to prepare diluted slurries having NaOH concentrations reduced to ¾ to 1/100 (corresponding to Examples 11a to 11g) of the original solution. As a comparison reference, another slurry (Example 11h) was prepared by thoroughly washing the cellulose xanthate and then adding NaOH so that the NaOH concentration was equal to the unwashed cellulose xanthate that is to be thoroughly filtered and washed (Example 11, slurry pH about 7, NaOH concentration 0 g/L). As in Example 1, defibration was carried out an each of these examples at 15,000 rpm for 15 minutes to determine its production yield of nanofiber. The results are shown in Table 5.

TABLE 5

| | Dilution level | NaOH concentration | pH | Production yield of nanofiber % |
|---|---|---|---|---|
| Example 11a | No dilution after 0.5% slurry preparation | 0.41 g/L | 11.2 | 32.20% |
| Example 11b | ¾ dilution | 0.31 g/L | 11.0 | 35.30% |
| Example 11c | ½ dilution | 0.21 g/L | 10.9 | 42.70% |
| Example 11d | ¼ dilution | 0.1 g/L | 10.6 | 47.50% |
| Example 11e | 1/10 dilution | 41 g/L | 10.3 | 64.60% |
| Example 11f | 1/50 dilution | 8.2 g/L | 9.8 | 74.70% |
| Example 11g | 1/100 dilution | 4.1 g/L | 9.5 | 76.20% |
| Example 11 | Filtering and washing | 0 g/L | 7.8 | 76.30% |
| Example 11h | After washing NaOH added to 0.5% concentration | 0.41 g/L | 11.2 | 36.10% |

The results indicated that a lower NaOH concentration caused by dilution led to a higher production yield of nanofiber. The results also indicated that dilution providing a pH below 10 can achieve a production yield of nanofiber close to the ratio provided by filtering and washing. Furthermore, Example 11h, in which the cellulose xanthate was washed and then NaOH was added so as to have the original NaOH concentration as in Example 11a, showed defibration similar to that of Example 11a. Accordingly, it was verified that the production yield did not vary depending on the amount of remaining impurities to be removed by washing.

<Defibration in the Presence of Ammonia>

Example 23

The same procedure as in Example 11 was used to thoroughly wash the cellulose xanthate. Ammonia water in a molar amount equal to that in Example 11a was added to the washed cellulose xanthate (pH 12.1) to substitute cations with ammonium ions. Then, the cellulose xanthate was subjected to defibration at 15,000 rpm for 15 minutes and the production yield of nanofiber was determined in a similar manner. The production yield of nanofiber was 71.7%, and the nanofiber degree of xanthation was 25.5 mol %.

<Other Materials Containing α-Cellulose>

Example 24

The same procedure as in Example 1 was conducted except that nadelholz unbleached kraft pulp (NUKP) was used as raw material pulp. Although the average degree of xanthation of cellulose xanthate was decreased to 24.8 mol %, defibration occurred successfully to give nanofiber at a high yield. The production yield of nanofiber was 81.4%.

Example 25

The same procedure as in Example 1 was conducted except that laubholz unbleached kraft pulp (LUKP) was used as raw material pulp. Although the average degree of xanthation of cellulose xanthate was decreased to 25.8 mol %, defibration occurred successfully to give nanofiber at a high yield. The production yield of nanofiber was 83.4%.

<Verifying Nanofiber Properties>

Examples 20 and 21, Reference Example 3

It was verified whether the nanofiber exhibited temperature-independent viscosity and thixotropy, which are properties specific to nanofiber. For viscosity measurement, the B-type viscosimeter DVH-E made by Tokimec (cone plate angle 3°, radius 1.2 cm) was used to measure viscosity at 20, 30, and 40° C. while changing the measuring rotating speed from 1 to 50 rpm. The cellulose xanthate nanofiber obtained in Examples 20 and 21 were used to give slurries at concentrations of 0.5 mass % (Example 20) and 1.0 mass % (Example 21), on which viscosity was measured. In Example 20a, viscosity was measured at temperatures of 20° C., 30° C., and 40° C. In Example 21, viscosity was measure at 20° C. only. As a reference for comparing nanofiber behaviors, viscosity was also measured on a slurry containing 0.5 mass % TEMPO-oxidized cellulose nanofiber (prepared in accordance with the method described in Non-Patent Document 2), which are conventionally known nanofiber (Reference Example 3). The results are shown in Tables 6 to 8.

TABLE 6

| | Temperature | | |
|---|---|---|---|
| Example 20 | 20° C. (Pa · s) | 30° C. (Pa · s) | 40° C. (Pa · s) |
| 1 rpm | 4.57 | 4.47 | 4.58 |
| 2.5 rpm | 2.41 | 2.38 | 2.43 |
| 5 rpm | 1.38 | 1.31 | 1.38 |
| 10 rpm | 0.79 | 0.77 | 0.81 |
| 20 rpm | 0.49 | 0.48 | 0.47 |
| 50 rpm | 0.28 | 0.28 | 0.29 |

TABLE 7

| Example 21 | 20° C. (Pa · s) |
|---|---|
| 1 rpm | 9.74 |
| 2.5 rpm | 5.28 |
| 5 rpm | 3.63 |

TABLE 7-continued

| Example 21 | 20° C. (Pa · s) |
|---|---|
| 10 rpm | 2.62 |
| 20 rpm | 2.01 |
| 50 rpm | 1.18 |

TABLE 8

| Reference Example 3 | Temperature | | |
|---|---|---|---|
| | 20° C. (Pa · s) | 30° C. (Pa · s) | 40° C. (Pa · s) |
| 1 rpm | 3.87 | 3.72 | 3.81 |
| 2.5 rpm | 1.84 | 1.77 | 1.88 |
| 5 rpm | 1.10 | 1.01 | 1.09 |
| 10 rpm | 0.63 | 0.67 | 0.67 |
| 20 rpm | 0.42 | 0.41 | 0.41 |
| 50 rpm | 0.24 | 0.23 | 0.24 |

Table 6 for Example 20 and Table 8 for Reference Example 3 show that the viscosity did not vary with a temperature rise. In addition, it was verified that any of the examples in different temperatures and concentrations exhibited thixotropy, showing a significant decease in viscosity as the agitating speed was increased. Since these properties were also shown in Reference Example 3, TEMPO-oxidized cellulose nanofiber, it was verified that the test materials obtained in Examples 20 and 21 had properties of nanofiber.

<Defibration in Organic Solvent>

Example 26

The washed cellulose xanthate in Example 18 was collected, and ethanol was added to give a slurry with the cellulose solid content of 0.5 mass %. The slurry was defibrated with a homogenizer (AM-7 made by Nihonseiki Kaisha Ltd.) at 17,000 rpm for 30 minutes to give cellulose xanthate nanofiber. The production yield of nanofiber was 80.6%. This example demonstrated that defibration was achieved in ethanol, which is an organic solvent.

<Defibration in Mixture with Other Components>

Example 27

Figure 7:
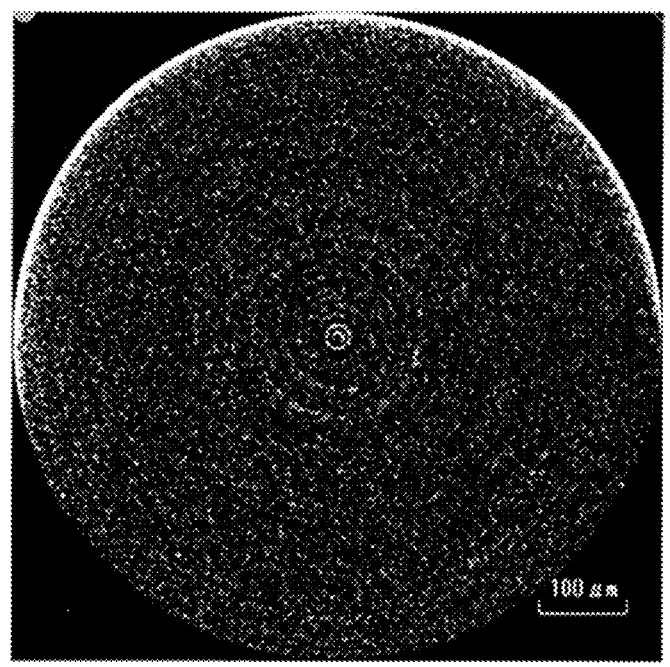
FIG. 7 is an X-ray CT image of a natural rubber master batch according to Example 27.

The cellulose xanthate prepared in Example 1 was weighed into a beaker so that the cellulose xanthate solid content was 1.2 g, and distilled water was added to make the cellulose xanthate dispersed therein. The cellulose xanthate was filtered through a glass fiber filter paper (GS-25 made by Advantec) and thoroughly washed with distilled water to remove impurities, alkali, and carbon disulfide. All the washed cellulose xanthate was collected (collected cellulose xanthate: 18 g, solid content: 6.65%). The resulting cellulose xanthate was mixed with 40 g of natural rubber latex (HA NR LATEX made by Regitex, solid content 60%, ammonia 0.7%) and 2 g of 14% ammonia water, and then subjected to defibration with a homogenizer. After defibration, the slurry exhibited greater viscosity and thixotropy compared with the slurry prior to defibration. For viscosity measurement, the E-type viscosimeter DVH-E made by Tokimec (cone plate: angle 3°, radius 1.2 cm) was used to measure viscosity at 20° C. while changing the measuring rotating speed from 1 to 50 rpm. The defibrated slurry was dried at 70° C. for two days and then vacuum dried to be made into a natural rubber master batch. X-ray CT measurement was conducted on the obtained natural rubber master batch to find that any clear image of fibers or aggregates was hardly observed. FIG. 7 shows the CT image. Accordingly, it was verified that the slurry was defibrated to a size smaller than the CT resolution and that the defibrated slurry was dispersed in the natural rubber latex. In addition, fibers having a fiber diameter less than 200 nm were observed under SEM. This example demonstrated that defibration was achieved in natural rubber latex.

Conditions for the X-ray CT measurement were as follows:
  Equipment: SMX-160CT-SV3S made by Shimadzu Corporation
  Spatial resolution: 1.4 μm
  Tube voltage: 90 kV, tube current: 70 μm
  SID: 400 mm, SOD: 5 mm
  Number of views: 1200 (half scan)

Comparative Example 10

Figure 8:
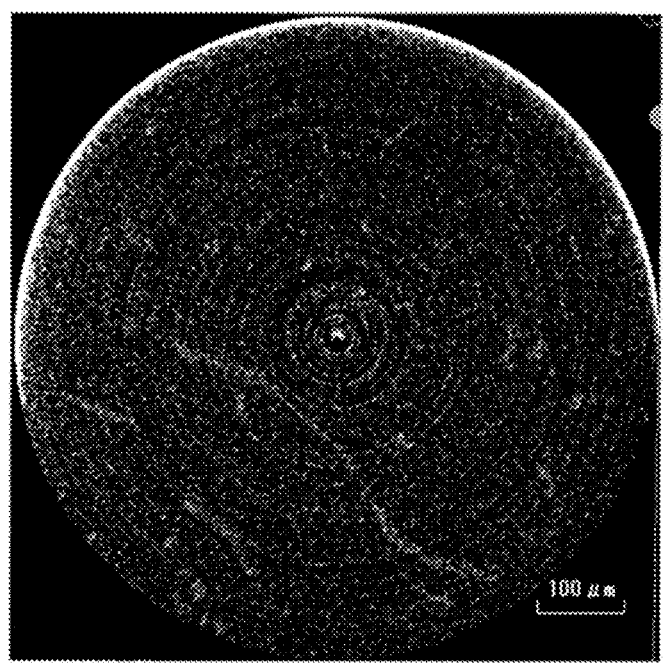
FIG. 8 is an X-ray CT image of a natural rubber master batch according to Comparative Example 10.

The cellulose xanthate in Example 27 was added to natural rubber latex but not defibrated to be made into a master batch, which was similarly evaluated. As a result, cellulose xanthate fibers were observed in X-ray CT (shown in FIG. 8) and SEM images.

<Verification of Thermal Stability>
<Method for Measuring Thermal Decomposition Temperature>

Before measurement, nanofiber slurries to be tested were freeze-dried. Procedures for freeze-drying the respective nanofiber were as follows:
  Cellulose xanthate nanofiber: the cellulose xanthate nanofiber slurry obtained in Example 11 was freeze-dried.
  TEMPO-oxidized cellulose nanofiber: the method described in Non-Patent Document 2 was used to prepare TEMPO-oxidized cellulose, which was subjected to defibration and then freeze-dried (Reference Example 3).
  Cellulose nanofiber not according to the present invention: BinFi-s WMa10002 made by Sugino Machine Limited was freeze-dried (Reference Example 4).
  Heating regenerating cellulose xanthate nanofiber: the product resulting from regeneration with heat obtained in Example 11 was subjected to desulfurization with a sodium sulfide solution, bleached with a sodium hypochlorite solution, washed with water, and then freeze-dried (Example 11i).
  Acid regenerating cellulose xanthate nanofiber: the product resulting from regeneration with acid obtained in Example 12 was subjected to desulfurization with a sodium sulfide solution, bleached with a sodium hypochlorite solution, washed with water, and then freeze-dried (Example 12a).

On each of the foregoing freeze-dried nanofiber products, the thermal decomposition temperature was measured with TG-DTA (TG8120 made by Rigaku Corporation) by raising temperature from room temperature to 400° C. at a rate of 10° C./minute. A graph was drawn plotting the weight reduction percentage along the vertical axis against the temperature along the horizontal axis. The thermal decomposition temperature was identified at an intersection of a tangential line when the weight was greatly reduced and a tangential line before the weight was reduced. The results are shown in Table 9.

TABLE 9

| Sample | | Thermal decomposition temperature |
|---|---|---|
| Example 11 | Cellulose xanthate nanofiber | 256° C. |
| Reference Example 3 | TEMPO-oxidized cellulose xanthate nanofiber | 224° C. |
| Reference Example 4 | Cellulose nanofiber (made by Sugino Machine) | 313° C. |
| Example 11i | Heating regenerating cellulose xanthate nanofiber | 309° C. |
| Example 12a | Acid regenerating cellulose xanthate nanofiber | 313° C. |

<Verifying Effect of Enhancing Paper Strength by Mixing with Gelatinized Starch Solution>

Examples 28 and 29

The cellulose xanthate prepared in Example 1 was washed and defibrated as in Example 11 to give a 0.5 weight % cellulose xanthate nanofiber slurry. A 25 weight % starch slurry was prepared by adding water to oxidized starch (Dynakote 68NB made by GSL). The starch slurry was heated in a boiling bath to be made into a starch glue solution, which was then cooled in a water bath. The cellulose xanthate nanofiber slurry was added so that the cellulose xanthate content was 1 weight % (Example 28) or 2 weight % (Example 29) relative to the starch solid content in the gelatinized starch solution, and water was added so that the overall concentration was 15 weight %. The slurry containing the added water was agitated with a homogenizer (8,000 rpm, 5 minutes) to be made into paper coating. The paper coating was applied on both sides of corrugating medium base paper for corrugated board (made by Rengo Co., Ltd. basis weight: 160 g/m$^2$) with a bar coater (No. 7), which was then dried for 2 minutes in a 120° C. environment with a rotary dryer (L-3D made by JAPO, Co., Ltd.). Subsequently, the humidity of the obtained paper was controlled in a 23° C. and 50% RH environment for one day. After the humidity control, the basis weight, compressive strength (specific compression strength), and tensile strength (breaking length) were measured by using the procedure described below. The results are shown in Table 10.

Comparative Examples 11 and 12

Another evaluation was carried out in a similar manner as in Example 28 on the paper coated with the gelatinized starch solution containing no cellulose xanthate nanofiber slurry (Comparative Example 11). Still another evaluation was similarly carried out on the corrugating medium base paper for corrugated board on which no paper coating was applied (Comparative Example 12). The results are also shown in Table 10.

[Method for Measuring Amount of Coating]

The paper coated with the obtained coating was absolutely dried and its basis weight (g/m$^2$) was measured. The amount of coating (g/m$^2$) was calculated by determining the difference from the absolute dry basis weight of the original base paper.

[Method for Measuring Compressive Strength and Specific Compression Strength]

The method according to JIS P8126 (corresponding to ISO 12192) was used to measure the compressive strength (N). The specific compression strength (N·m$^2$/g) was calculated by dividing the obtained compressive strength by the basis weight (g/m$^2$).

[Method for Measuring Tensile Strength and Breaking Length]

The method described in JIS P8116 (corresponding to ISO 1974) was used to measure the tensile strength (kN/m). To eliminate the influence of basis weight, the breaking length (km) was calculated by dividing the tensile strength (kN/m) by (basis weight×9.81÷1000).

TABLE 10

| | Paper coating | Basis weight (g/m$^2$) | Amount of coating (g/m$^2$) | Specific compression strength (N · m$^2$/g) | Breaking length (km) |
|---|---|---|---|---|---|
| Comparative Example 12 | — | 155.5 | — | 157.1 | 4.66 |
| Comparative Example 11 | Starch glue solution | 164.3 | 8.8 | 212.1 | 5.96 |
| Example 28 | 1% cellulose xanthate nanofiber contained | 164.4 | 8.8 | 212.2 | 6.08 |
| Example 29 | 2% cellulose xanthate nanofiber contained | 164.5 | 8.9 | 213.0 | 6.17 |

Example 28 exhibited higher tensile strength than Comparative Example 11 although both include the same amount of paper coating. Accordingly, it was found that adding cellulose xanthate nanofiber to a gelatinized starch solution improved the tensile strength of the coated paper. Furthermore, Example 29 with a higher percentage of cellulose xanthate nanofiber exhibited still higher tensile strength than Example 28. Accordingly, it was demonstrated that the tensile strength can further be improved by changing the amount of cellulose xanthate nanofiber.

<Enhancing Cellulose Film Strength by Mixing with Viscose>

Example 30

The cellulose xanthate prepared in Example 1 was treated as in Example 11 to give a 0.5 weight % cellulose xanthate nanofiber slurry. The cellulose xanthate nanofiber slurry was added to viscose (made by Rengo Co., Ltd., cellulose concentration 9.5%). The amount of added slurry was determined so that the concentration of cellulose xanthate was adjusted to 5 weight % relative to the cellulose solid content in viscose. The viscose mixed with the cellulose xanthate was agitated with a homogenizer (8,000 rpm, 5 minutes) and then centrifuged (3,000 rpm, 3 minutes) to be defoamed. The defoamed viscose mixed with cellulose xanthate was cast on a glass plate into a thickness of 10 mils (254 μm) by using a film-applicator, solidified and regenerated (desulfurizing bath: 150 g/L sulfuric acid, 180 g/L sodium sulfate, about 30° C.), and than washed with water. The washed product was subjected to desulfurization with a desulfurizing bath: 10 g/L sodium sulfide (about 55° C.), washed again, and then removed from the glass plate to give a wet film. The wet film was placed between water-absorbing filter papers (No. 26-WA made by Advantec Toyo Kaisha, Ltd.), dewatered with a couch roll, and dried for two minutes in a 120° C. environment with a rotary dryer (L-3D made by JAPO, Co., Ltd.) to give a cellulose film. Subsequently, the humidity of the obtained cellulose film was controlled in a 23° C. and 50% RH environment for one day. The humidity-controlled film (three pieces each) was punched into test pieces (No. 8 dumbbell) (n=5), and the thickness of each test piece was measured. The test pieces were tensile tested on a tensile testing machine (grasping width: 30 mm, speed: 20 mm/min.). The tensile strength and elongation were calculated in accordance with the following equations. The results are shown in Table 11.

Tensile strength (MPa)=breakage load (N)/cross sectional-area (thickness×4, mm$^2$)

Elongation (%)=elongation at break (mm)/30 mm×100

Example 31

The same procedure as in Example 30 was conducted to prepare films for evaluation except that the cellulose xanthate of Example 1 was replaced with the cellulose xanthate of Example 7.

Comparative Example 13

Another evaluation was similarly carried out on a film prepared by using the viscose in Example 30 containing no cellulose xanthate nanofiber slurry, and adding water thereto to adjust the cellulose concentration.

TABLE 11

|  | Cellulose film | Thickness (μm) | Tensile strength (MPa) | Elongation (%) |
| --- | --- | --- | --- | --- |
| Comparative Example 13 | No nanofiber contained | 13.6 | 161 | 11.3 |
| Example 30 | 5% cellulose xanthate nanofiber of Example 1 contained | 13.6 | 187 | 15.1 |
| Example 31 | 5% cellulose xanthate nanofiber of Example 7 contained | 13.0 | 183 | 13.0 |

Both Examples 30 and 31 exhibited improved tensile strength of cellulose films owing to addition of cellulose xanthate nanofiber.

<Effect of Dispersed Cellulose Xanthate Nanofiber>

Examples 32a to 32d

The cellulose xanthate prepared in Example 1 was treated as in Example 11 to give 0.5 weight % cellulose xanthate nanofiber slurry. Distilled water was added to the slurry, which was then centrifuged (10,000 rpm, 20 minutes) to precipitate undefibrated fibers, and the supernatant was collected as nanofiber slurry (0.13% concentration). A 25 weight % starch slurry was prepared by adding water to oxidized starch (Dynakote 68NB made by GSL). The cellulose xanthate nanofiber slurry was added so that the cellulose xanthate content was 1 to 5 weight % relative to the starch solid content in the starch slurry, and water was added so that the overall concentration was 15 weight %. After water was added, the slurry was agitated with a homogenizer (8,000 rpm, 5 minutes), and 100 mL of the slurry was metered into a 100 mL measuring cylinder. The measuring cylinder was allowed to stand, and the level of precipitated starch powder was measured every hour starting from 100 mL The results are shown in Table 12. As Comparative Example 14, a starch slurry with no cellulose xanthate added was evaluated in the same manner. Examples 32a to 32d each demonstrated slower precipitation of starch than Comparative Example 14.

TABLE 12

|  |  | 0 hour | 1 hour | 2 hours | 3 hours |
| --- | --- | --- | --- | --- | --- |
| Comparative Example 14 | Starch slurry | 100 mL | 84 mL | 75 mL | 68 mL |
| Example 32a | 1% cellulose xanthate nanofiber contained | 100 mL | 93 mL | 88 mL | 85 mL |
| Example 32b | 2% cellulose xanthate nanofiber contained | 100 mL | 93 mL | 90 mL | 87 mL |
| Example 32c | 3% cellulose xanthate nanofiber contained | 100 mL | 95 mL | 92 mL | 90 mL |
| Example 32d | 5% cellulose xanthate nanofiber contained | 100 mL | 95 mL | 92 mL | 90 mL |

<Verifying Effect of Enhancing Natural Rubber Sheet Strength by Mixing with Natural Rubber Latex>

Example 33

Preparing a Master Batch

The cellulose xanthate prepared in Example 1 was treated as in Example 20 to give 0.5 weight % cellulose xanthate nanofiber slurry. The obtained slurry was mixed with natural rubber latex (HA NR LATEX made by Regitex, solid content 60%, ammonia 0.7%) and with 14% ammonia water (5 parts by weight of the cellulose xanthate nanofiber slurry was added relative to 100 parts by weight of the natural rubber solid content), and was agitated with a homogenizer (8,000 rpm, 5 minutes). The agitated slurry was dried at 70° C. for two days and then vacuum dried to be made into a natural rubber master batch.

Preparing a Compound

The obtained master batch was masticated by using a mixing roll (ϕ200 mm× L 500 mm mixing roll machine made by Nippon Roll MFG. Co., Ltd.) heated to 50° C., and stearic acid (made by Nacalai Tesque, Inc.), zinc oxide (made by Nacalai Tesque, Inc.), sulfur (made by Nacalai Tesque, Inc.), and a vulcanization accelerator (SANCELER NS-G made by Sanshin Chemical Industry Co., Ltd.) formulated as in Table 13 below were added to, and mixed with, the master batch to be made into a rubber compound having a thickness of at least 2 mm.

TABLE 13

| Natural rubber | 100 parts by weight |
| --- | --- |
| Zinc oxide | 6 parts by weight |
| Stearic acid | 0.5 parts by weight |
| Sulfer | 3.5 parts by weight |
| Vulcanization accelerator | 0.7 parts by weight |

Vulcanization

The obtained rubber compound was put into a mold and compression molded at 150° C. for 8 minutes to be made into a 2 mm thick crosslinked rubber sheet.

Measuring Strength Properties

The obtained crosslinked rubber sheet was punched into JIS No. 3 dumbbell-shaped test pieces (n=5) and the thickness of each test piece was measured (n=3). A tensile testing machine (Precision Universal Tester AG-1000D made by Shimadzu Corporation) was used to conduct a tensile test (grasping width: 50 mm, speed: 500 mm/min., compliant with JIS K6251) to determine the stress at break and the strain of the test pieces. Compared with Comparative Examples 15 and 16 described below, Example 33 exhibited higher strain and higher stress at break, with greater strain, retained elongation, higher strength, and unaffected rubber properties. The result implied interactions with rubber because the cellulose xanthate nanofiber contained sulfur.

Comparative Examples 15 and 16

Another evaluation was carried out in a similar manner as in the example above on a crosslinked rubber sheet prepared as a master batch by drying the natural rubber latex with no cellulose xanthate nanofiber slurry added (Comparative Example 15). Still another evaluation was similarly carried out on a crosslinked rubber sheet prepared by using a master batch where cellulose nanofiber (BiNFi-sWMa-10002 made by Sugino Machine Limited) was added instead of cellulose xanthate nanofiber (Comparative Example 16). The results are also shown in Table 14.

TABLE 14

|  | At breakage | |
| --- | --- | --- |
|  | Stress (MPa) | Strain (%) |
| Example 33 | 31.7 | 737 |
| Comparative Example 15 | 23.5 | 705 |
| Comparative Example 16 | 29.0 | 640 |

The invention claimed is:

1. A method for producing a cellulose xanthate nanofiber, the method comprising defibrating cellulose xanthate that contains cellulose I or a cationic substitution substance of the cellulose xanthate.

2. The method for producing a cellulose xanthate nanofiber according to claim 1, the method comprising:

treating a material containing cellulose with an aqueous alkali metal hydroxide solution to produce alkali cellulose that contains cellulose I; and reacting the alkali cellulose with carbon disulfide to give cellulose xanthate, wherein this cellulose xanthate is used for the method.

3. A method for producing a cellulose nanofiber, the method comprising regenerating the cellulose xanthate nanofiber obtained by the method for producing a cellulose xanthate nanofiber according to claim 1.

4. A cellulose xanthate nanofiber that contains cellulose I, wherein any hydroxyl group in cellulose is substituted with a xanthate group represented by a formula (1) below:

$$—CSS^- M^{n+} \qquad (1)$$

where a cation $M^{n+}$ is at least one selected from a hydrogen ion, a monovalent or polyvalent metal ion, an ammonium ion, and an aliphatic or aromatic ammonium ion, and n=1, 2, or 3.

5. The cellulose xanthate nanofiber according to claim 4, having an average degree of xanthation of 0.1 mol % or more and 33.3 mol % or less, an average fiber length of 2 μm or more and 100 μm or less, and an average fiber diameter of 3 nm or more and 250 nm or less.

6. A regenerated cellulose nanofiber obtained by regenerating the cellulose xanthate nanofiber according to claim 4, wherein the regenerated cellulose nanofiber has an average fiber length of 2 μm or more and 100 μm or less and an average fiber diameter of 3 nm or more and 250 nm or less.

7. A rubber composition comprising the cellulose xanthate nanofiber according to claim 4.

8. A method for producing a cellulose nanofiber, the method comprising regenerating the cellulose xanthate nanofiber obtained by the method for producing a cellulose xanthate nanofiber according to claim 2.

9. A regenerated cellulose nanofiber obtained by regenerating the cellulose xanthate nanofiber according to claim 5, wherein the regenerated cellulose nanofiber has an average fiber length of 2 μm or more and 100 μm or less and an average fiber diameter of 3 nm or more and 250 nm or less.

10. A rubber composition comprising the cellulose xanthate nanofiber according to claim 5.

* * * * *